US006453459B1

(12) United States Patent
Brodersen et al.

(10) Patent No.: US 6,453,459 B1
(45) Date of Patent: Sep. 17, 2002

(54) MENU AUTHORING SYSTEM AND METHOD FOR AUTOMATICALLY PERFORMING LOW-LEVEL DVD CONFIGURATION FUNCTIONS AND THEREBY EASE AN AUTHOR'S JOB

(75) Inventors: Rainer Brodersen, Santa Clara; Gregory Kent Wallace, Palo Alto, both of CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/010,267

(22) Filed: Jan. 21, 1998

(51) Int. Cl.[7] .................................................. G06F 9/44
(52) U.S. Cl. ..................... 717/100; 707/501.1; 345/719; 345/723; 386/46
(58) Field of Search .................. 345/418, 302, 345/474, 326, 719–726; 705/51; 707/522, 501.1; 386/97, 46, 4, 125–126; 709/227; 717/100–116, 136, 149

(56) References Cited

U.S. PATENT DOCUMENTS

| | | | |
|---|---|---|---|
| 5,450,489 A | * 9/1995 | Ostrover et al. | 705/51 |
| 5,515,490 A | * 5/1996 | Buchanan et al. | 707/500.1 |
| 5,544,305 A | * 8/1996 | Ohmaye et al. | 345/776 |
| 5,574,843 A | * 11/1996 | Gerlach, Jr. | 345/418 |
| 5,592,602 A | * 1/1997 | Edmunds et al. | 345/474 |
| 5,619,636 A | * 4/1997 | Sweat et al. | 707/500.1 |
| 5,659,793 A | * 8/1997 | Escobar et al. | 707/500.1 |
| 5,691,972 A | 11/1997 | Tsuga et al. | 707/500.1 |
| 5,694,548 A | * 12/1997 | Baugher et al. | 709/227 |
| 5,778,142 A | * 7/1998 | Taira et al. | 386/97 |
| 5,892,507 A | * 4/1999 | Moorby et al. | 707/500.1 |
| 5,907,704 A | * 5/1999 | Gudmunson et al. | 717/100 |
| 6,199,082 B1 | * 3/2001 | Ferrel et al. | 707/522 |

FOREIGN PATENT DOCUMENTS

| | | | |
|---|---|---|---|
| EP | 0 843 312 A2 | 5/1998 | |
| EP | 0 877 377 A1 | 11/1998 | |
| GB | 2 309 805 A | 8/1997 | |
| GB | 2 309 805 | * 8/1997 | ............. G06F/9/44 |
| WO | WO 94/28480 | 12/1994 | |

OTHER PUBLICATIONS

Uesaka, Y.; "DVD Authoring System," National Technical Report, vol. 42, No. 5, Oct. 1, 1996, pp. 90–96; figures 1–7.
Hughes, K.; "The Tools and Twists of DVD Authoring," Emedia Professional, Online Inc., ISN 1090–946X, vol. 10 No. 12, 12/97, pp. 37–40, 44–48. 50.
Ginige, Athula, et al.; "Hypermedia Authoring," IEEE Multimedia, vol. 2, No. 4, 1221/95, pp. 24–35.

(List continued on next page.)

Primary Examiner—Tuan Q. Dam
Assistant Examiner—Hoang-Vu Antony Nguyen-Ba
(74) Attorney, Agent, or Firm—Pillsbury Winthrop LLP

(57) ABSTRACT

A DVD authoring system in a processor-based system removes an author from consideration of the DVD Specification during authoring. According to a preferred embodiment, the authoring system provides an authoring engine having an interactive graphical authoring interface, a data management engine, an emulator, a compiler, a multiplexer and a simulator. Using summary authoring data, the compiler builds a skeleton-form PGC layout structure comprising control PGC abstractions and router PGC abstractions. The compiler then resolves the PGC abstractions according to source-target connections. During playback on a DVD player, the PGC abstractions form elements in a connection-switching abstraction superstructure. Accordingly, in response to DVD-consumer and other control events, a source PGC preferably determines target PGC information and then transfers control, via virtual connections through necessary router PGC abstractions, to a target PGC abstraction. The target PGC abstraction then correspondingly initiates playback of a movie chapter or displays a menu.

4 Claims, 18 Drawing Sheets

OTHER PUBLICATIONS

Sugiyama, Kenji et al.; "Elements of a New Authoring System for Digital Video Disk (DVD)" SMPTE Journal, vol. 106, No. 11; Nov. 1, 1997, pp. 762–767.

Guenette, R.; "Authorware and Iconauthor. Power for Multimedia CD–ROM," CD ROM Professional, Online, Inc., vol. 8, No. 10, Oct. 1, 1995, pp. 81–82, 84, 86–88.

Ryu, S.W., et al.; "A Hierarchical Layered Model for DVD Authoring System," IEEE Transactions on Consumer Electronics, vol. 42, No. 3, Aug. 1, 1996, pp. 814–819.

Sonic Solutions, Instruction Manual, "Premastering in the Age of DVD; A Primer for Creating Content for DVD" 1997.

DVD–Video Software Production Guidebook (Japan Version), DVD Forum, Pioneer Electronic corporation, May 1997.

Daikin U.S. Comtec Laboratories, Reference Manual, "Scenarist 2, The Ultimate Solution for DVD," undated.

* cited by examiner

MENU AUTHORING SYSTEM AND METHOD FOR AUTOMATICALLY PERFORMING LOW-LEVEL DVD CONFIGURATION FUNCTIONS AND THEREBY EASE AN AUTHOR'S JOB

FIELD OF THE INVENTION

The present invention relates generally to mass data storage and retrieval, and more particularly to apparatus and methods for authoring a digital versatile disk.

BACKGROUND OF THE INVENTION

New mass data storage means provide not only for storing greater amounts of multimedia and other information, but also for more interactive data retrieval by consumers. For example, one such storage means is espoused by the "DVD Specification for Read-Only Disc, Physical, File Format and Video Specifications" (DVD Consortium 1997), hereinafter referred to as the "DVD Specification". Other examples include further DVD-related technologies (e.g. DVD-Audio, DVD-RAM, etc.) as well as non-DVD technologies.

The Physical and File System portions of the DVD Specification defines the physical encoding and organization of data for storage on read-only digital versatile disk ("DVD ROM") media. The Video portion of the DVD Specification defines a data set ("DVD-Video data set") with which pre-recorded DVD-Video discs must conform in order to assure proper reading, decoding and playback when inserted into a media reader/decoder ("DVD-player"). More specifically, the Video portion specifies how "control data" and audio/video "presentation data" are encoded and ordered within the data set. The control data determines how presentation of audio/video data will proceed when the disc is played back on a DVD-player and consists of low-level state information, data structures and instruction sets which govern what kinds of functions and user operations a DVD player can perform.

The DVD Specification is further hereby fully incorporated herein by reference as if repeated verbatim immediately hereinafter.

The process of encoding and authoring a DVD movie title, as currently practiced, includes a number of separate and distinct steps requiring similarly separate and distinct expertise. After movie production, raw film and/or video footage is edited, the soundtrack is edited and mixed, and a movie film or video master is created. This master is subsequently digitized, encoded as video and audio streams and stored as data files. In accordance with the DVD Specification, the Moving Pictures Expert Group ("MPEG-1 or MPEG-2") format is used to encode the video streams and any one or more of a number of specified formats (e.g. MPEG-1or MPEG-2 Audio, Dolby AC-3, PCM) is used to encode the audio streams. Graphic data (i.e. still or moving images for creating menus and other presentation data) is also created and stored in conventional graphic files. Finally, authoring guidelines, the encoded audio and video stream files and the graphic files are gathered for the authoring phase.

During authoring, a DVD author utilizes the guidelines and file information to construct a DVD movie-title. The authored movie-title determines what a user of a resultant movie title will see and hear, and what kinds of interactions the user can command when the movie title is played back by a DVD-player. The author organizes the video, audio and (often author-created) subtitle files, divides the movie into segments ("chapters"), creates menus, and specifies low-level instructions. The low-level instructions will set parameters, define fixed or optional jump points and their destinations and determine the order and options by which playback of still pictures, movie chapters and associated audio tracks will proceed based on the user's menu selections and/or use of other DVD-player controls (i.e. typically using a remote control device).

Once authored, the author's organizational decisions, subtitle, chapter and menu decisions, and low-level instructions are compiled into control data, and the encoded video, audio and subtitle streams, as well as the graphic data files, are multiplexed into presentation data, which together constitute the DVD-Video data set. Finally, this DVD-Video data is converted into a "disc image layout" file, which can be used to burn a "rite-once DVD-R" disc, or can be stored onto a tape to send to a DVD-ROM manufacturing plant for creating a "master" disc, which can then be used for replication.

Conventional DVD authoring systems comprise a computer system running an application-specific DVD authoring program. An exemplary, widely used conventional DVD authoring system is Scenarist-II.

Scenarist-II is essentially an attempted, nearly direct embodiment of the DVD Specification. Using Scenarist-II, an author organizes data streams, and constructs menus and DVD structures according to the DVD Specification. Top level structures (i.e. up to 99 "VTSs" and "VTSMs", a "VMG" and a "VMGM") are constructed by selecting the structure type and then populating the structure with one or more low-level command segments ("program chains" or "PGCs") including movie or menu references. Throughout this process, the author also selects from among available data formats, as well as from among the numerous DVD options and requisite parameters, using a number of provided lists and other data and parameter representations. Stated alternatively, all structures and PGC parameters, capabilities and references must be fully specified by the author on an ongoing basis during authoring.

Unfortunately, the DVD Specification is very complex, as are the conventional programs that attempt to embody it. Available options are extensive, as are the numerous listings of options and parameters within programs such as Scenarist-II. The potential combinations of structures and PGCs are also extensive, and many such combinations will not ultimately result in functional DVD movie-titles.

To make matters more difficult, the PGCs (i.e. basic and frequent constructs of the DVD Specification and therefore of programs such as Scenarist-II) are counter-intuitive. Often, many PGCs (including both operative and so-called "dummy" PGCs) must be used in specific combinations to provide a DVD consumer with even the most basic control capabilities. Limitations imposed by the DVD Specification must also be considered throughout the process. Thus, errors in planning and/or programming might well remain undetected until after a substantial number of structures are formed. In addition, given the sheer number of structures, PGCs, commands, options and parameters involved, identifying, locating and correcting errors is difficult and time-consuming.

Consequently, while providing extensive low-level control and an expedient authoring-to-compilation correspondence, conventional authoring systems require an extensive expertise with regard to both the DVD Specification and the authoring system itself. Further, even assuming such expertise, authoring is extremely time-consuming and is therefore typically very costly. In addition, even assuming resolution of other factors, the time and expertise required would likely prevent authoring of even a preliminary movie-title as a directorial aid during the movie production process.

A further disadvantage of conventional authoring systems is that experimentation and all but necessary modification are often compromised due to time and cost considerations. Thus, many DVD movie titles (due to limited budget to support expensive authoring time) provide a DVD consumer with only minimal playback control, navigation flexibility and interactivity.

Accordingly, there is a need for an authoring system and method that enables DVD authoring in a manner removed from the structures and low-level instruction sets of the DVD Specification, thereby reducing the time, cost and complexity of the authoring process.

There is further a need for such an apparatus and method whereby authoring can be conducted in an intuitive manner, while maximizing flexibility and access to features provided by or otherwise not in conflict with the DVD Specification.

SUMMARY OF THE INVENTION

The present invention provides a data processing-system based authoring system and method that essentially removes an author from consideration of the structures and low-level instruction sets of the DVD Specification. More specifically, the present authoring system removes the ordered tasks associated with creating DVD structures and programming PGCs, and replaces them instead with an interactive, intuitive and graphical authoring environment.

The present invention further provides for flexible program flow in response to control events. Many interactive controls, menu button destinations and other features that are possible in accordance with the DVD Specification can be specified by an author in multiple instances and according to quick, intuitive and interactively modifiable selections. Thus the invention facilitates authoring of a DVD movie title by even an inexperienced author with context sensitive responsiveness to DVD consumer instructions and other DVD player-generated events.

Accordingly, a preferred embodiment of the present invention comprises an authoring engine having an integrated interface with which an author performs the above tasks a data management engine for storing and recalling authoring information, a simulator for viewing progressive and/or comparatively authored movie titles prior to compiling, a compiler, a multiplexer and an emulator for viewing authored movie titles after compiling and multiplexing.

Included within and facilitating the ability of these elements to remove an author from the DVD Specification are several abstractions. Preferably, the interface provides such "user abstractions" as arranging movies (i.e. data streams including video, audio, subtitles, chapter points and other elements), creating menu layouts (i.e. menus, menu buttons and still or moving images with or without sound) and specifying connections among these arrangements and layouts, each in a simple and intuitive, yet highly flexible way. Further abstractions include a network or connection-switching abstraction and a number of control and router PGC abstractions from which the connection-switching abstraction is constructed.

Authoring instructions entered through the interface are preferably broken down into component parts and stored by the data management engine. The invoked compiler, using only summary authoring information, preferably constructs a skeleton form PGC layout structure comprised of PGC abstractions corresponding to the number of authored movie elements. The compiler then completes the layout structure according to author-selected and default source-target connections.

Further according to a preferred embodiment, during playback of a resultant DVD movie title, a source PGC abstraction is invoked in response to DVD player and/or consumer instructions. The source PGC abstraction determines target information and transfers control, through necessary router PGC abstractions, to a target PGC abstraction. The target, in accordance with the target information, plays a movie chapter, displays a menu, or sets and/or modifies one or more DVD parameter.

These and other objects, advantages and benefits of the present invention will become apparent from the drawings and specification that follow.

DETAILED DESCRIPTION OF A PREFERRED EMBODIMENT

For clarity sake, the discussed embodiment herein will be directed primarily toward storage according to the DVD Specification, and more specifically at authoring motion picture DVD ROMS ("movie titles"). It should be understood, however, that the present invention relates to a broad range of program and data storage and retrieval utilizing a variety of media, only a subset of which will be specifically identified herein. The types of DVD ROMS which can be authored are further in no way limited to movie titles. Other examples include but are not limited to music videos, documentaries, educational videos, corporate training, medical applications and other continuous play or interactive information which utilizes audio, video and/or other presentation data.

Figure 1:
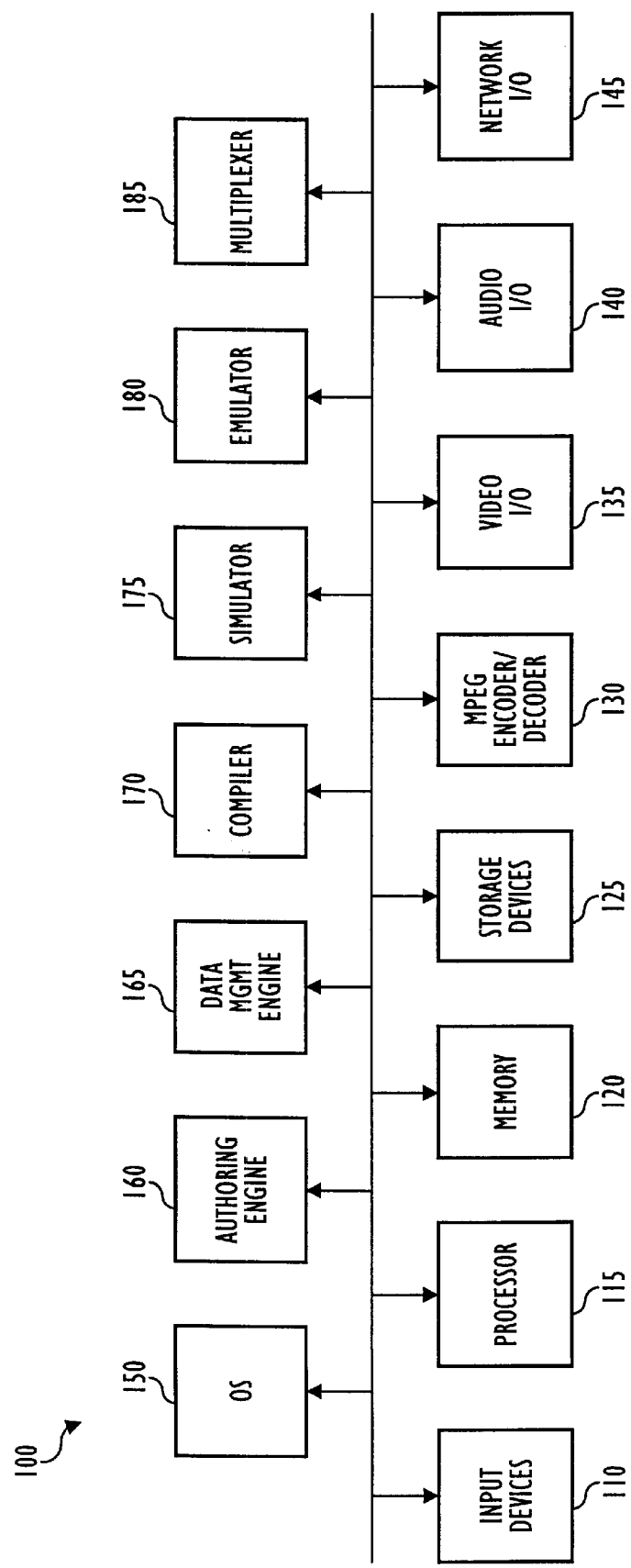
FIG. 1 is functional block diagram generally illustrating an authoring system according to a preferred embodiment of the invention.

As illustrated in FIG. 1, a preferred embodiment of authoring system 100 according to the invention preferably comprises electrically connected hardware elements including input devices 110, processor 115, memory 120, storage 125, MPEG encoder/decoder 130, video I/O device 135 and audio I/O device 140. Authoring system 100 further comprises software elements including operating system 150, authoring engine 160, data management engine 165, compiler 170, simulator 175, emulator 180 and multiplexer 185.

It will be apparent to those skilled in the art that several variations of the authoring system elements are contemplated and within the intended scope of the present invention. For example, given processor and computer performance variations and ongoing technological advancements, hardware elements such as MPEG encoder/decoder 130 may be embodied in software or in a combination of hardware and software. Similarly, software elements such as multiplexer 185 may be embodied in hardware or in a combination of hardware and software. Further, while connection to other computing devices is indicated as network I/O 145, wired, wireless, modem and/or other connection or connections to other computing devices (including but not limited to local area networks, wide area networks and the internet) might be utilized. A further example is that the use of distributed processing, multiple site viewing, information forwarding, collaboration, remote information retrieval and merging, and related capabilities are each contemplated. Various operating systems and data processing systems can also be utilized, however at least a conventional multitasking operating system such as Windows95® or Windows NT® (trademarks of Microsoft, Inc.) running on an IBM® (trademark to International Business Machines) compatible computer is preferred and will be presumed for the discussion herein. Input devices 110 can comprise any number of devices and/or device types for inputting commands and/or data, including but not limited to a keyboard, mouse, and/or speech recognition. (The use of a keyboard and a mouse are exemplified throughout the discussion that follows.)

Figure 2:
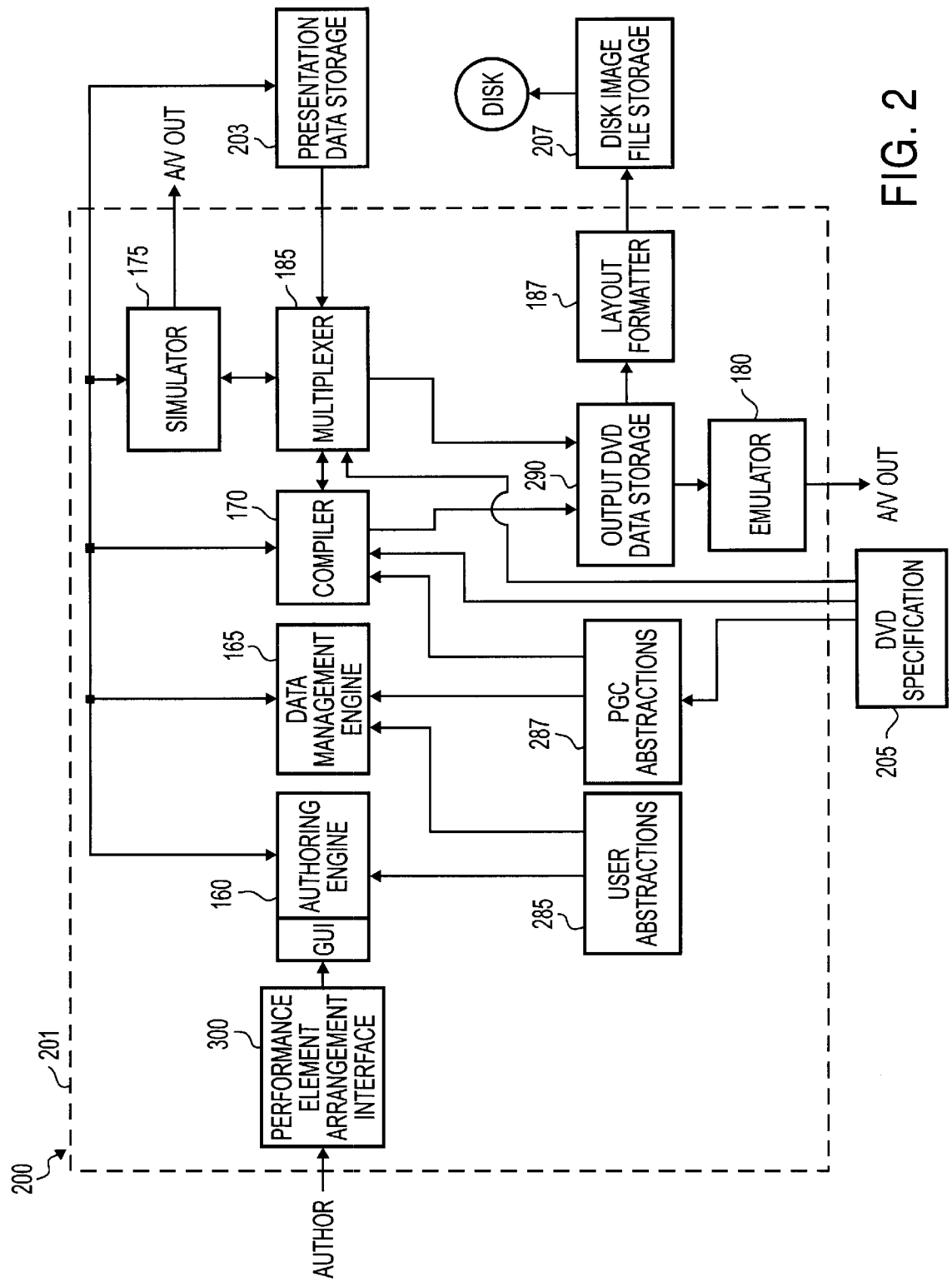
FIG. 2 is a functional block diagram illustrating in more detail a preferred authoring program of the authoring system shown in FIG. 1, according to the invention.

The FIG. 2 block diagram illustrates in greater functional detail an authoring program 201 of the preferred authoring system of FIG. 1. As shown, authoring program 201 comprises authoring engine 160 (which includes interface 160a), data management engine 165, compiler 170, simulator 175, emulator 180, multiplexer 185, output DVD data storage 290 and layout formatter 187, user abstractions 285 and PGC abstractions 287.

It is discovered through examination of the features supported by DVD players that the basic presentation data types and consumer controls available to an author of DVD movie titles can be generalized and then reconstructed as abstracted user data types and controls. Further, despite the complexity of the DVD Specification, many of its programming constructs can also be generalized and then reconstructed as abstracted DVD program chains ("PGCs") operating within a further abstracted network or connection-switching superstructure. Such user abstractions 285 and PGC abstractions 287, as integrated into authoring engine 160, data management engine 165 and compiler 170 (as illustrated), effectively remove an author using authoring program 201 from consideration of DVD Specification 205. These abstractions further remove such consideration without unduly limiting, for most practical purposes, authoring flexibility, PGC efficiency or interactive responsiveness of a resultant DVD-ROM, among other factors. In addition, these abstractions provide a framework of re-useable components that are readily adaptable to further modification for providing improvements, and for re-use in a variety other DVD and non-DVD applications.

Authoring program 201 is preferably implemented in C++, an object-oriented language, for reliability, updateability and other known generalized advantages of object-oriented programming. Those skilled in the computer arts will appreciate however, that despite such advantages, other environments and/or programming languages of various object-oriented and non-object-oriented types can also be utilized.

Operationally, an author enters authoring information and instructions for activating and controlling authoring program 201 through interface portion 160a of authoring engine 160. Authoring engine 160 interactively receives entered information and commands by correspondingly adjusting interface portion 160a, invoking a further authoring program module, sending entered authoring information to data management engine 165, retrieving authored information from data management engine 165, and sending and/or retrieving presentation data from presentation data storage 203. Data management engine 165 responds to authoring engine 160 by receiving and storing authored information from authoring engine 160 and/or sending information, which it retrieves from storage (and/or from a remote source), to authoring engine 160. Simulator 175 responds to authoring engine 160 by retrieving authoring data from data management engine 165, retrieving multiplexed presentation data from multiplexer, and simulating an authored DVD-ROM in conjunction with interface 160a.

Compiler 170 responds to authoring engine 160 by retrieving authored information from data management engine 165, compiling the information and storing the compiled information (".ifo files") in output DVD data storage 290. Emulator 180 responds to authoring engine 160 by retrieving compiled data from output DVD data storage 290, retrieving multiplexed data from output DVD data storage 290 and emulating an authored DVD-ROM in conjunction with interface 160a. Multiplexer 185 responds to authoring engine 160 by receiving DVD parameter information from compiler 170, retrieving presentation data from presentation data storage 203 and combining the retrieved information and data in accordance DVD Specification 205. Multiplexer 185 then stores the combined information and data ("DVD data stream" or ".vob file") in output DVD data storage 290. Layout formatter 187 retrieves the .vob files and ifo files from output DVD data storage 290 and combines these files into a single "disc image" file, which it then stores in disc image file storage 207. The disc image file can then be sent through network I/O 145 (FIG. 1) to additional apparatus for further review, processing and/or for burning one or more DVD-ROMs 207.

FIGS. 3 through 10, with reference to FIG. 2, illustrate how an interface according to the invention enables an author to assemble a movie title essentially removed from DVD programming specifications 207 (FIG. 2) of the DVD Specification. Preferred interface 160*a* is illustrated as an application running under a Windows95® or Windows NT® (trademark of Microsoft, Corp.) operating system.

The FIG. 3 screenshot illustrates a preferred authoring window 300, which an author can utilize to select an arrangement of audio-visual material including video segments ("video clips"), audio segments ("audio clips") and subtitles (hereinafter referred to collectively as "performance data").

Authoring window 300 is divided into movable, modifiable and replaceable groupings or "views" and "panels" including presentation data panel 301, performance assembly panel 302, assembled elements panel 307, log panel 308 and preview video panel 309. Assembly panel 302 is further divided into video assembly portion 320, audio assembly portion 330 and subtitle assembly portion 340 (which are collectively referred to herein as performance view 303), and performance tools portion 360. Authoring window 300 also includes authoring toolbar 399*a* and menu bar 399*b*. For clarity sake, the following discussion assumes that a single, continuous movie is being authored (i.e. a movie having component video, audio and subtitle data streams each of which begins at the start of the movie and ends at the conclusion of the movie).

Presentation data panel 301 provides a display listing for each presentation data file that an author has selected and loaded for use in assembling movies and menus either during a current authoring session or when continuing a re-initiated, prior authoring session. File listings include file name 311, file duration 313, and file type 315 parameters. File name 311 lists the name of a file. File duration 313 lists the playback duration of files such as video data files and audio data files. File type 315 alternatively lists a file format, which is generally indicated by a filename extension, or a recognized data type such as "video" data or "audio" data. As will be further discussed, presentation data file listings can be used interactively during an authoring session.

Performance assembly view 303 of performance assembly panel 302 is used by an author to graphically and interactively assemble loaded video and/or audio data, to add and assemble subtitles, and/or to add chapter points. For these purposes, performance view 303 includes video assembly portion 320, audio assembly portion 330, subtitle assembly portion 340 and chapter assembly portion 350 respectively. Video assembly portion 320 is used by an author to assemble graphic objects referencing stored video data files ("video clips"). As discussed, these files, once initially selected, are listed in presentation data panel 301. Video frame thumbnails 323*a* and 323*b* are indicative of chapter points as will be further discussed herein.

Audio assembly portion 330 of performance assembly panel 302 is used by an author to receive graphic objects referencing stored audio data files ("audio clips"). As with video clips, audio clips, once selected for use, are listed in and selected from presentation data panel 301 for arrangement purposes. Up to eight (alternate language) audio data streams or audio "tracks", exemplified by audio tracks 331*a* through 331*c*, are available in accordance with DVD Specification 205 (FIG. 2). Audio bars 332*a* and 332*b*, which represent author-arranged audio clips, have a length that reflects the playback time of the audio data represented. Separators 333 are further indicators of chapter points, as with video frame thumbnails 323*a* and 323*b* of video assembly portion 320. Audio tracks 332*a* through 332*c* further include audio encoding indicators 334*a*, audio format indicators 334*b*, track number indicators 335 and selected language indicators 336, which are indicative respectively of audio data file encoding and playback format, selectable audio track number 336 and modifiable language label 335. Language labels 335 can be set by author selection or, as is expected, automatically by recognition of languages spoken in a recorded dialog of a respective audio track.

Subtitle assembly portion 340 provides for entry, retrieval and/or editing of up to thirty-two (alternate language) frame-based subtitle sequences, as exemplified by tracks 341*a* and 341*b*. Exemplary subtitle frames 342*a* and 342*b* illustrate textual subtitle contents. Subtitles are entered in a conventional manner using a conventional text editor (not shown) which is invoked by activating a subtitle frame (e.g. by menu selection or double-clicking) and/or by retrieving a pre-existing subtitle file using, for example, presentation data panel 301. As with audio assembly portion 330, subtitle portion 340 includes selectable track numbers and modifiable language label indicators.

Performance assembly view 303 also includes chapter assembly portion 350, which is used by an author to graphically and interactively assemble chapter points. Chapter assembly portion 350 includes wall clock 351, reference offset clock 352, author-assembled chapter indicators 353*a* through 353*c*, chapter time indicators 354*a* through 354*c* and reference time indicators 355*a* through 355*c*. Wall clock 351 indicates a time within a video clip corresponding to a cursor position over chapter portion 350 of assembly panel 302. Offset clock 352 indicates the start time of a currently indicated video clip according to the reference timecode of a master tape (i.e. from which the video data file was created). Chapter indicators 353*a* through 353*c* show chapter points (i.e. points to which a DVD-ROM consumer can advance) as arranged during authoring. Chapter time indicators 354*a* through 354*c* and reference time indicators 355*a* through 355*c* display the elapsed time of corresponding selected chapter points from the start of a movie and from the start of a clip respectively. Reference times are typically recorded (and thus can be selectively retrieved and displayed) utilizing Society of Motion Pictures and Television ("SMPTE") timecode.

As noted earlier, performance assembly panel 302 and the other panels and views of authoring window 300 are replaceable. Tabs 302*a* provide one alternative control structure for selectively switching between initiated or "open" authoring tasks, for example, to alternate between assembling presentation data of multiple movies, for creating menu layouts, and/or for other authoring tasks. Other control structures include menu options (not shown) for selectively de-coupling panels and transport enabling controls (362*a* through 362*c* and 363*a* through 363*b*), and further for re-coupling in the illustrated default arrangement, in an author-selectable arrangement and/or interactively by an author. Panels can be resized and/or re-arranged among other window capabilities, as will be understood by those skilled in the art in view of the discussion herein.

Assembly tools portion 360 of performance assembly panel 302 comprises selectable zoom controls 361a through 361c, preview transport buttons including stop 362a, play 362b and frame advance 362c, preview transport start time selector 363a and stop time selector 363b, selected clip indicator 364a and total clips indicator 364b. Zoom controls 361a through 361c are used respectively for increasing the viewable data range of a selected area within performance assembly view 303 of performance assembly panel 302, for selecting a portion of performance assembly view 302 for such viewing, and for decreasing the viewable data range. Transport controls 362a through 362c provide video playback control when previewing a video clip, audio clip and/or subtitle data using preview video panel 309, or when selecting a representative video frame in a video clip as a preview thumbnail (as with exemplary thumbnails 323a and 323b). Transport control 362a halts video, audio and/or subtitle playback, transport control 362b initiates/continues playback and transport control 362c provides for per-frame ("step") viewing, as will be understood by those skilled in the art. Start and end time selectors 363a and 363b are used respectively for selecting and monitoring video, audio and/or subtitle playback position and for setting and monitoring a playback stop time.

Assembled elements panel 306 provides interactive and selectable listings of authored contents of a current movie title, including but not limited to movie volume 361, movies 362 and menus 363.

Log panel 308 provides selectable progress reports and other information relating to decoding/encoding of presentation data, compiling and layout of a disk file format according to DVD disk format specifications 205 (FIG. 2). These reports are automatically created and can be accessed using log tabs exemplified by tabs 381 and 383.

Preview video panel 303 selectively displays a video frame corresponding to a cursor position over assembly panel chapter portion 350, video assembly portion 320, audio assembly portion 330, subtitle portion 340 and/or chapter portion 350 of assembly panel 302. In addition, preview video panel is used for previewing video data using transport controls 362a through 362c, start and stop time selectors 363a and 363b or directly invoking the panel using selection or drag-and-drop capabilities. (As will be understood by those skilled in the art, encoded video and audio files are decoded and buffered, as needed, for playback in a conventional manner using MPEG encoder/decoder 130 of FIG. 1.)

The following toolbar chart lists the respective elements of toolbar 399. It will be understood by those skilled in the art, in view of the discussion herein, that the toolbar elements can vary substantially and includes user-defined expandable and replaceable elements. The elements shown are provided as defaults.

| Label | Referenced as | Description |
| --- | --- | --- |
| 401 | New volume | Loads default values and adjusts the interface for a new movie title. |
| 403 | New menu | Loads default values and adjusts the interface for a new menu layout. |
| 405 | New movie | Loads default values and adjusts the interface for authoring a new movie. |
| 407 | Connections | Switches to an existing connections interface or adjusts the interface, according to default values for initially setting connections. |
| 413–415 | Cut, copy and paste | Provide conventional functions except as described herein for connections. |
| 421 | Compile start | Initiating compiler operation. |
| 423 | Compiler stop | Interrupts compiler operation. |
| 425 | DVD Layout | Invokes DVD Disk layout operation. |
| 427 | Write Tape | Provides for output of multiplexed data stream to tape. |
| 429 | Simulator | Invokes simulator |

Figure 3:
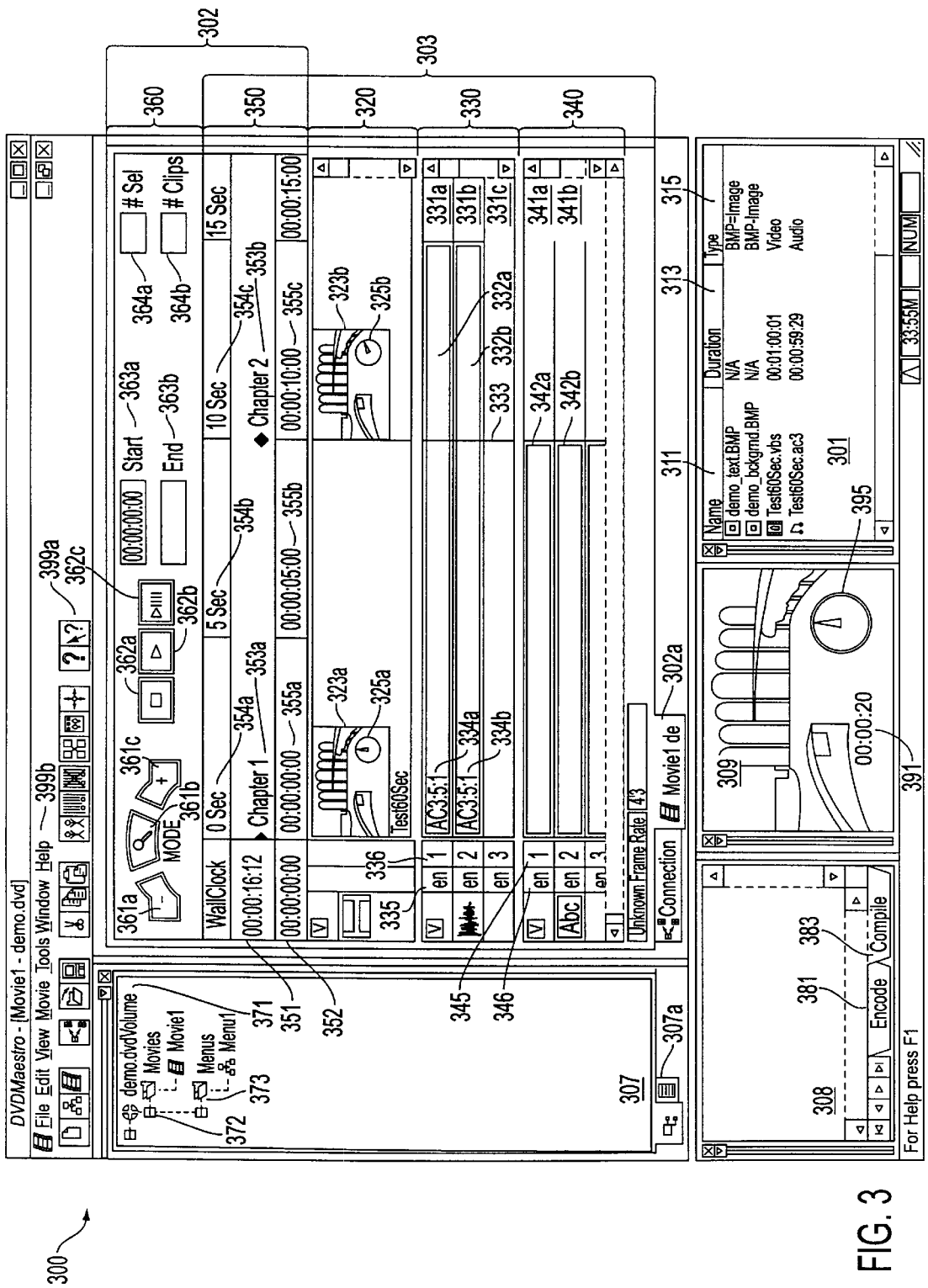
FIG. 3 is a screenshot of a preferred performance element arrangement interface portion of the FIG. 2 authoring program, according to the invention.
Figure 4:
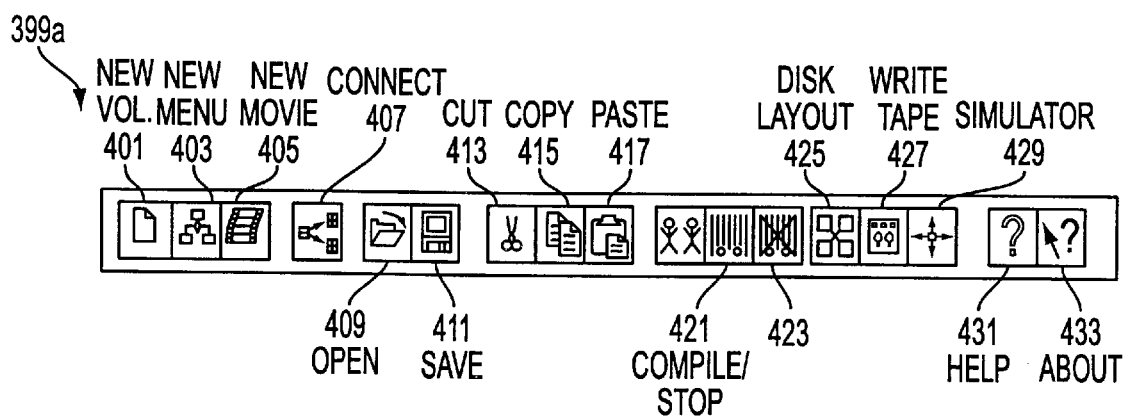
FIG. 4 is a blowup of the FIG. 3 screenshot showing, in more detail, a preferred authoring toolbar for accessing authoring program modules and functions.
Figure 5:
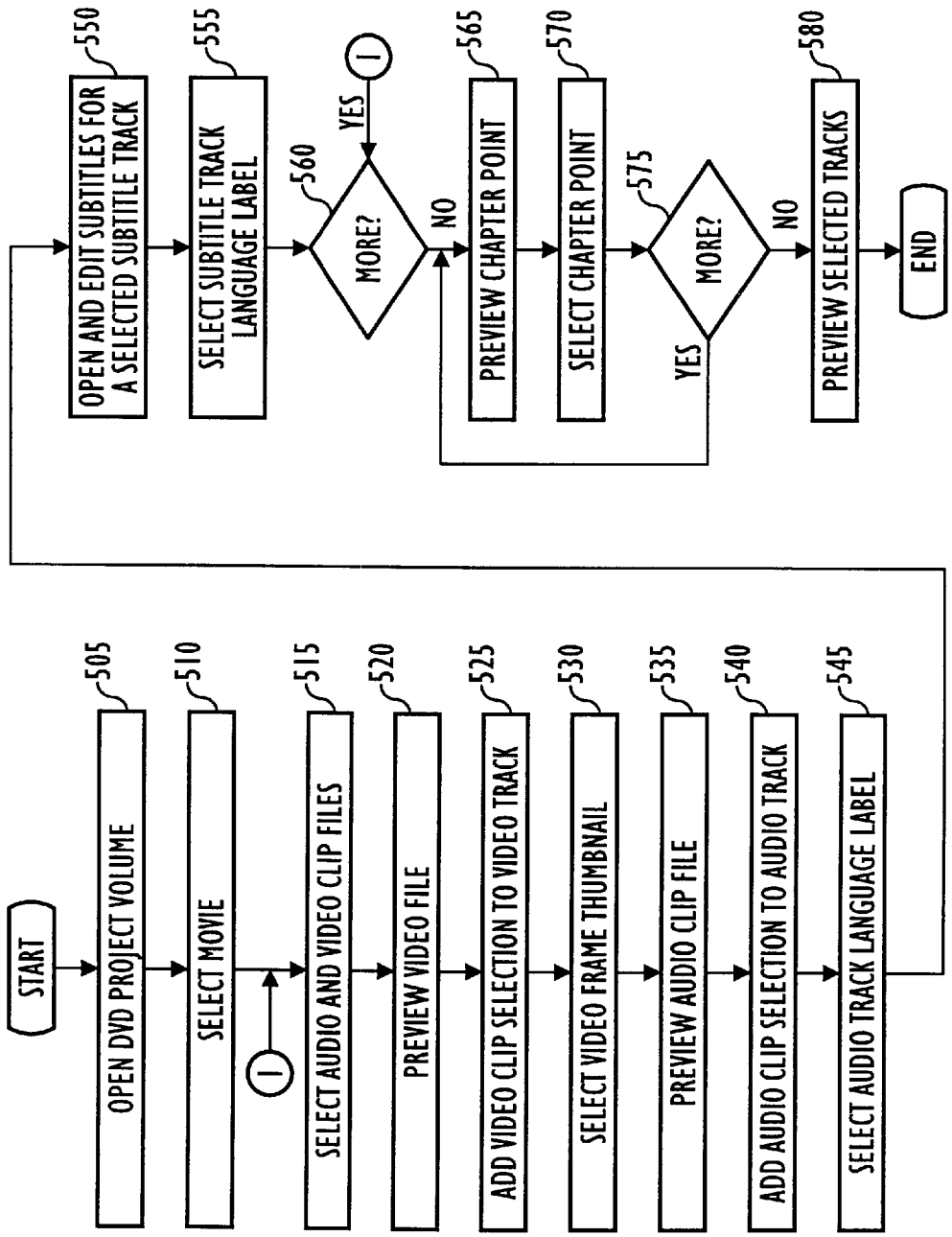
FIG. 5 is a flowchart illustrating an exemplary method used by an author to create a performance element arrangement using the performance element arrangement interface portion of FIG. 3.

The FIG. 5 flowchart illustrates, by way of example and with reference to FIGS. 3 and 4, how an interface in accordance with the invention enables an author to assemble performance data and objects without consideration for structures, commands or ordered tasks imposed by DVD programming specifications 207 (FIG. 2). Select, open and drag-and-drop, among other operations, and clicking, double-clicking, click-and-drag and other user actions associated with graphic interfaces are well known and will not be further expounded upon herein.

As shown, in step 505, an author initiates a new project ("volume") by selecting new volume 401 (FIG. 4). In step 510, the author initiates a new movie by selecting new movie 405. In step 515, the author adds video and audio files to presentation data panel 301 (FIG. 3) for potential use in the volume by movies and menus. In step 520, the author can preview a video file in preview panel 304 by dragging its icon in presentation data panel 301 to preview panel 304 and/or, if desired, by invoking transport controls 362a through 362c, preview timer 393 and/or other playback-related controls. In step 525, the author adds a selected video clip to the currently opened movie by double-clicking its icon in presentation data panel 301 or by dragging the icon from presentation data panel 301 to video assembly portion 320 of performance view 303. In step 530, the author can select a video frame thumbnail other than a first frame for reference viewing by dragging the pointer of thumbnail timer 325a and/or by using transport controls 362a through 362b.

In step 535, the author can preview an audio file by selecting its icon in presentation data panel 301 and using controls including stop 362, play 362b, using start time and end time selectors 363a and 363b and/or using other play-related controls. In step 540, the author adds a selected audio clip to a next available track of the currently opened movie by double-clicking its icon in presentation data panel 301. (Alternatively, the author can add a selected audio clip to a specific audio track by dragging the icon from presentation data panel 301 to a selected track in audio assembly portion 330 of performance view 303. In step 545, the author selects a language label by selecting selected language indicator 335 and selecting a listed element.

In step 550, the author opens a subtitle frame and enters subtitle information for display in a video frame during playback of video clips. In step 555, the author selects a language label corresponding to the subtitle track containing the subtitle frame. If, in step 560, the author elects to add more performance data, then the author returns to step 520.

In step 565, the author moves a cursor within chapter assembly portion 350 of performance view 303 to view video frames available as chapter points. In step 570, the author selects a chapter point. If, in step 575, the author elects to add more chapter points, then the author continues at step 565.

In step 580, the author selects an audio track number and optionally selects a subtitle track number and/or playback start and/or end times before selecting play button 362b to preview playback of the video clip and the audio clip referenced by the selected track number.

Figure 6A:
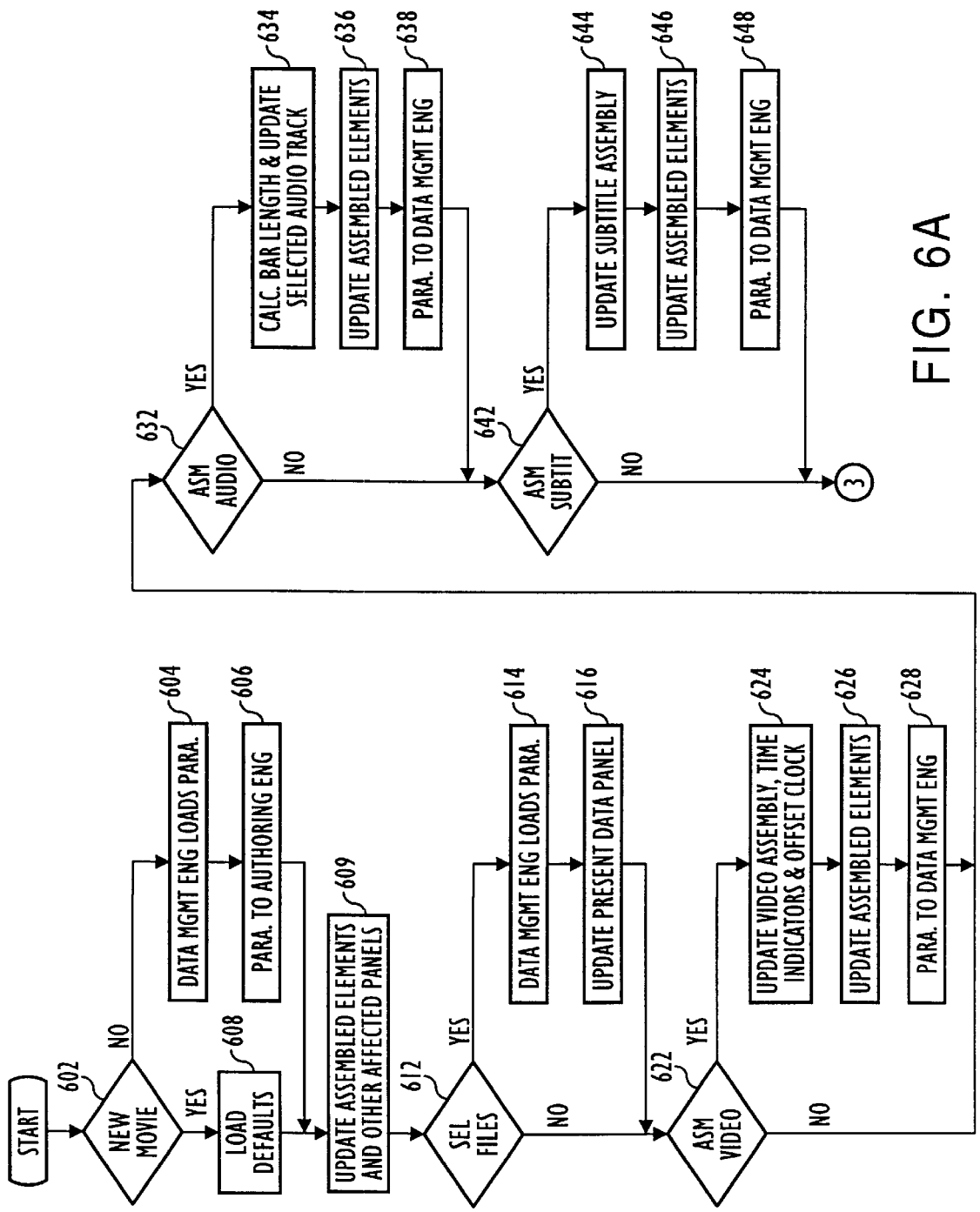
FIG. 6a is a flowchart illustrating preferred responses of the authoring program to authoring while the performance element arrangement interface portion of FIG. 3 is active.
Figure 6B:
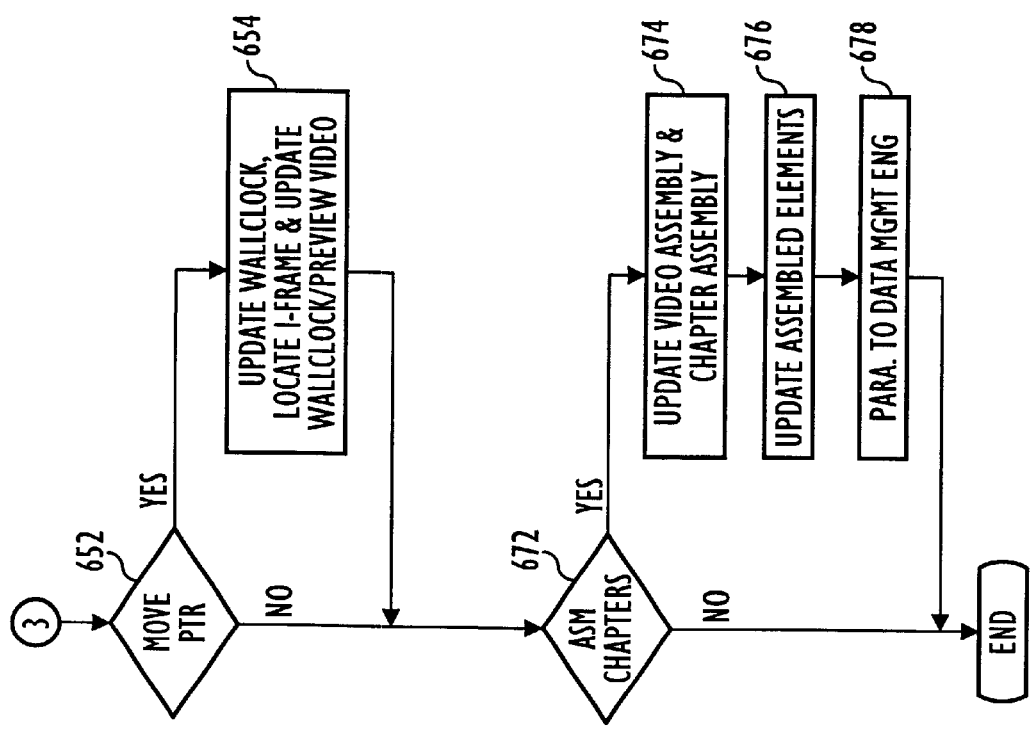
FIG. 6b is a flowchart further illustrating preferred responses of the authoring engine to authoring while the performance element arrangement interface portion of FIG. 3 is active.

The FIGS. 6a and 6b flowchart (with reference to FIGS. 2 and 3) generally illustrates responses by the preferred authoring program 201 to an author's actions according to the invention. As shown, if in step 602 an author selects a movie assembled in a prior authoring session, then, in step 604, data management engine 165 (FIG. 2) loads related parameters and, in step 606, sends the parameters to authoring engine 160. Otherwise, default parameters for a new movie are loaded in step 608.

In step 609, authoring engine 160 updates assembled elements panel 307 (FIG. 3) and other affected interface 160a elements to indicate the movie parameters. If, in step 612, the author selects presentation data files, then data management engine 165 loads and sends the respective presentation data file parameters to authoring engine 160 in step 614, which updates presentation data panel 301 in step 616. If, in step 622, the author assembles one of the selected video clips, then authoring engine 160 accordingly updates video assembly portion 320, chapter assembly portion 350 and offset clock 352 in step 624, updates assembled elements panel 307 in step 626, and sends the video clip parameters to data management engine 165 for storage in step 628. Similarly, if the author assembles one of the selected audio clips in step 632, then authoring engine 160 updates the selected track of audio assembly portion 320 in step 634, updates assembled elements panel 307 in step 636, and sends the audio clip parameters to data management engine 165 in step 638. If, in step 642, the author assembles subtitle data, then authoring engine 165 updates subtitle assembly portion 340 in step 644, updates assembled elements 307 in step 646, and sends subtitle data and parameters to data management engine 160 in step 628.

If, in step 652, the author moves an interface 160a pointer (e.g. a mouse pointer) within chapter assembly portion 360, then in step 654 authoring engine 160 updates wallclock 351, finds an I-frame (i.e. a video frame that is completely described without reference to other frames) within the video clip corresponding to the mouse pointer position and displays the I-frame in preview video panel 309. If, in step 672, the author assembles a chapter point, then authoring engine 160 updates video assembly portion 340 and chapter assembly portion 350 in step 674, updates assembled elements panel 307 in step 676, and sends corresponding chapter parameters to data management engine 165 in step 678.

Figure 7:
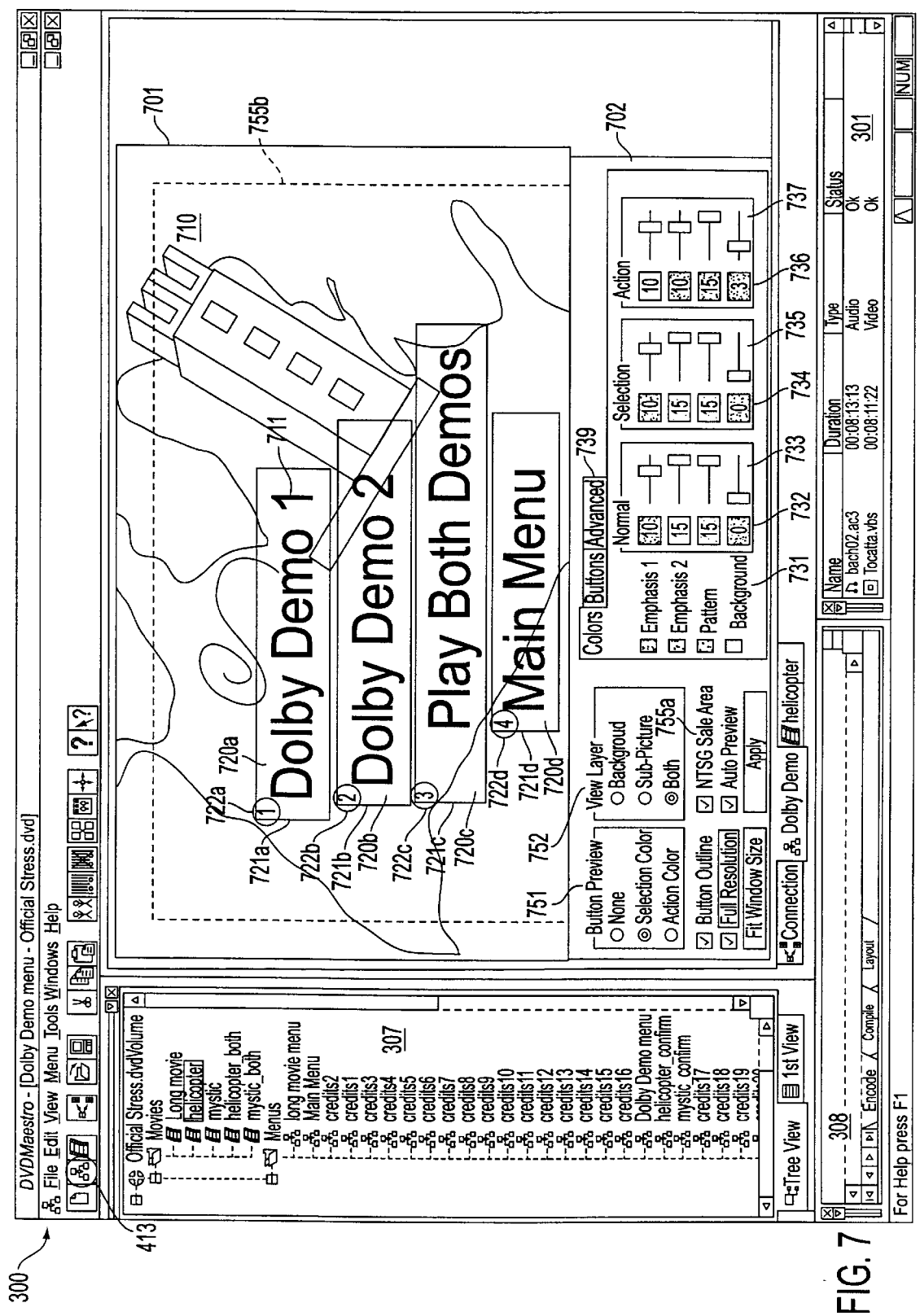
FIG. 7 is a screenshot of a menu element layout interface portion of the FIG. 2 authoring program, according to the invention.

The FIG. 7 screenshot illustrates the preferred authoring window 300 of FIG. 3 with the performance data assembly panels replaced by panels for allowing an author to layout menus. More particularly, menu layout panel 701 and menu tools panel 702 are selected, sized and positioned to replace performance view 303 of FIG. 3. An exemplary menu layout including graphic and textural images is shown in menu layout panel 701 for purposes of illustration. Menu layout panel 701 is used visually and interactively by an author to retrieve, add, place and modify menu elements using menu tools panel 702 selections.

In accordance with the DVD Specification, menu elements presentable to a DVD consumer can include a background image ("background"), an overlay image ("subpicture") and up to twenty-five buttons. For the present example, author-selected background 710 is a multicolor design, and author-selected subpicture 711 includes the textural information, Dolby Demo 1, Dolby Demo 2, Play Both Demos and Main Menu. Four author-created buttons 720a through 720d including button frames 721a through 721d are also shown. Each of button numbers 722a through 722d is added by authoring program 201 (FIG. 2) in response to creation of a respective button for identification purposes (i.e. during authoring and for use in compilation).

Menu tools panel 702 comprises controls for implementing selectable menu element parameters and for selectably altering the display characteristics of elements within menu layout panel 701 during an authoring session. For example, color selection boxes 732, 734, 736 and 738 allow an author to choose a button outline color for display (in a consumer viewing scenario) when a button is not selected ("normal"), when a consumer points at the button ("selection") and when a button is invoked ("action") respectively. An author can also select the opacity of the buttons for these cases using opacity sliders 733, 735, and 737 respectively. Similarly, an author can select button shapes and other characteristics by selecting one of the layout feature tabs 739 and utilizing the tool sets that appear in a respective tool set panel (not shown). An author might, for example, utilize prior button shape, color, texture, opacity and/or normal, selection and activation color combinations used with a prior authoring session as either a starting point for further changes or without further modification. Other parameter combinations might also be utilized. Safe area toggle 755a allows an author to selectively display safe area indicator 755b of menu layout panel 701 (which bounds an area that is assured to be displayed on a consumer television). Display controls 751 and 752 provide for altering the characteristics indicated which, in light of the prior discussion, will be understood by those skilled in the art without further edification.

Layout feature tabs 749 also provide access to button ordering tools (not shown). As with other authoring parameters, an author can selectively utilize an existing order of buttons that will be traversed in a currently displayed menu when a consumer pushes directional buttons on a remote control device. An alternative order can also be set using any number of methods including but not limited to using a displayed remote control device or dragging an arrow from a starting point to an ending point. Such features and their operational characteristics, given the foregoing, will be understood by those skilled in the art without further edification.

Figure 8:
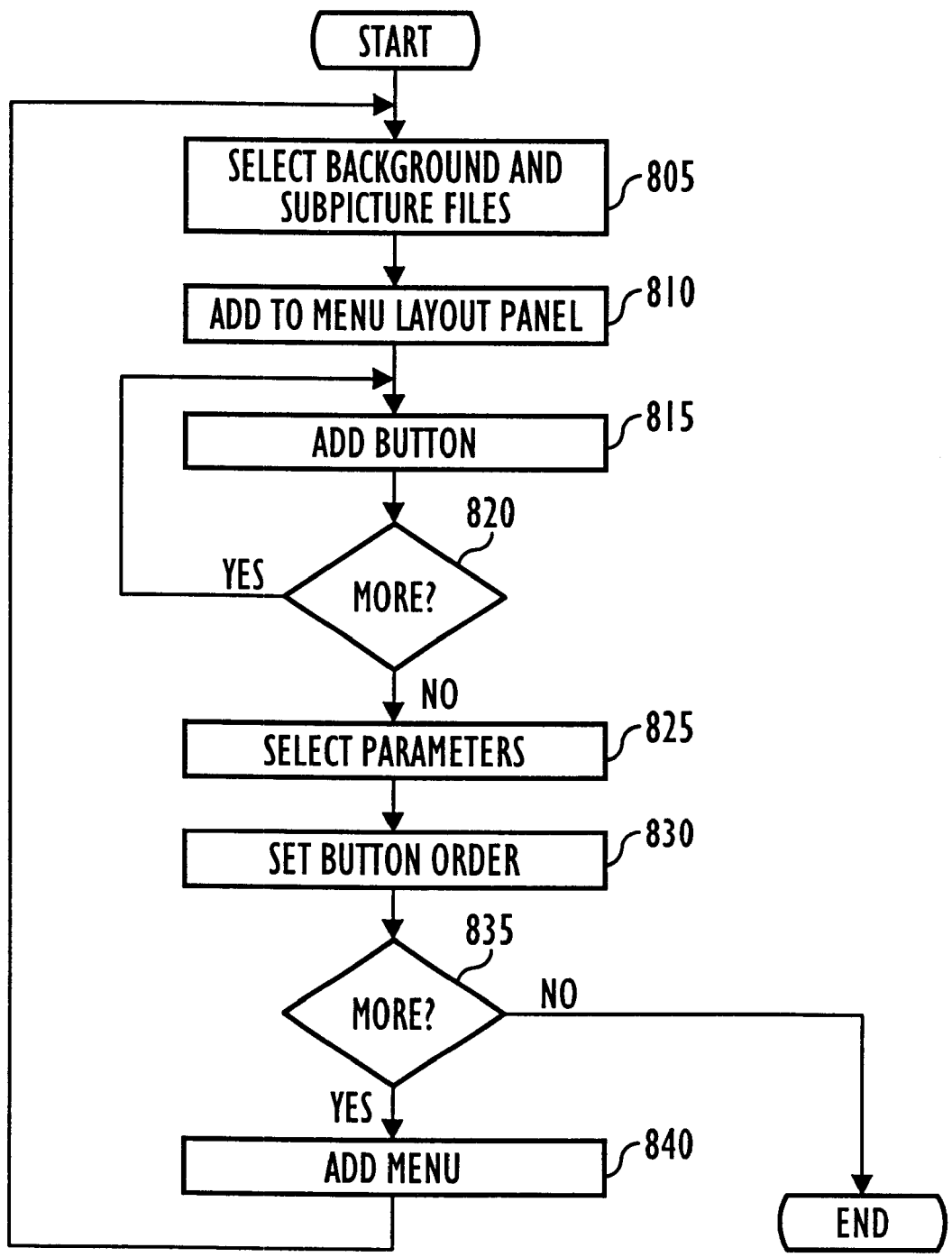
FIG. 8 is a flowchart illustrating an exemplary method used by an author to create a menu layout using the menu element layout interface portion of FIG. 7.

The FIG. 8 flowchart shows how the actions required for laying out a menu are consistent with those for assembling performance data. Once again, authoring is visually and interactively achieved without requiring any specific ordering of actions. Therefore, as with performance data assembly, the specific ordering of actions is given for purposes of illustration only.

As shown, in step 805, the author selects background and subpicture files for inclusion in a menu layout. Selected files will appear in presentation data panel 301 (FIG. 7). In step 810, an author adds a background and a subpicture to the current menu by double-clicking on file listings, dragging the files to menu layout panel 701 or by using a similar method. In step 815, the author draws (i.e. drags a box) around subpicture text forming a button frame, thereby indicating button placement directly in menu layout panel 701. If, in step 820, more button frames remain to be added, then the author returns to step 815.

In step 825, the author selects a button and sets shape, size, opacity and other parameters using preset combinations and/or color selection boxes 732, 734, 736 and 738, opacity sliders 733, 735, and 737 and/or other tools. In step 830, the author sets the intra-menu button order in the manner already described. If, in step 840, more menus remain to be created, then the author selects add menu button 413 in step 840, and returns to step 805. New elements appear in assembled elements panel 307 and control data (i.e. relating to added elements and their layout characteristics) are sent to data management engine 165 (FIG. 2) as with performance data assembly.

Figure 9:
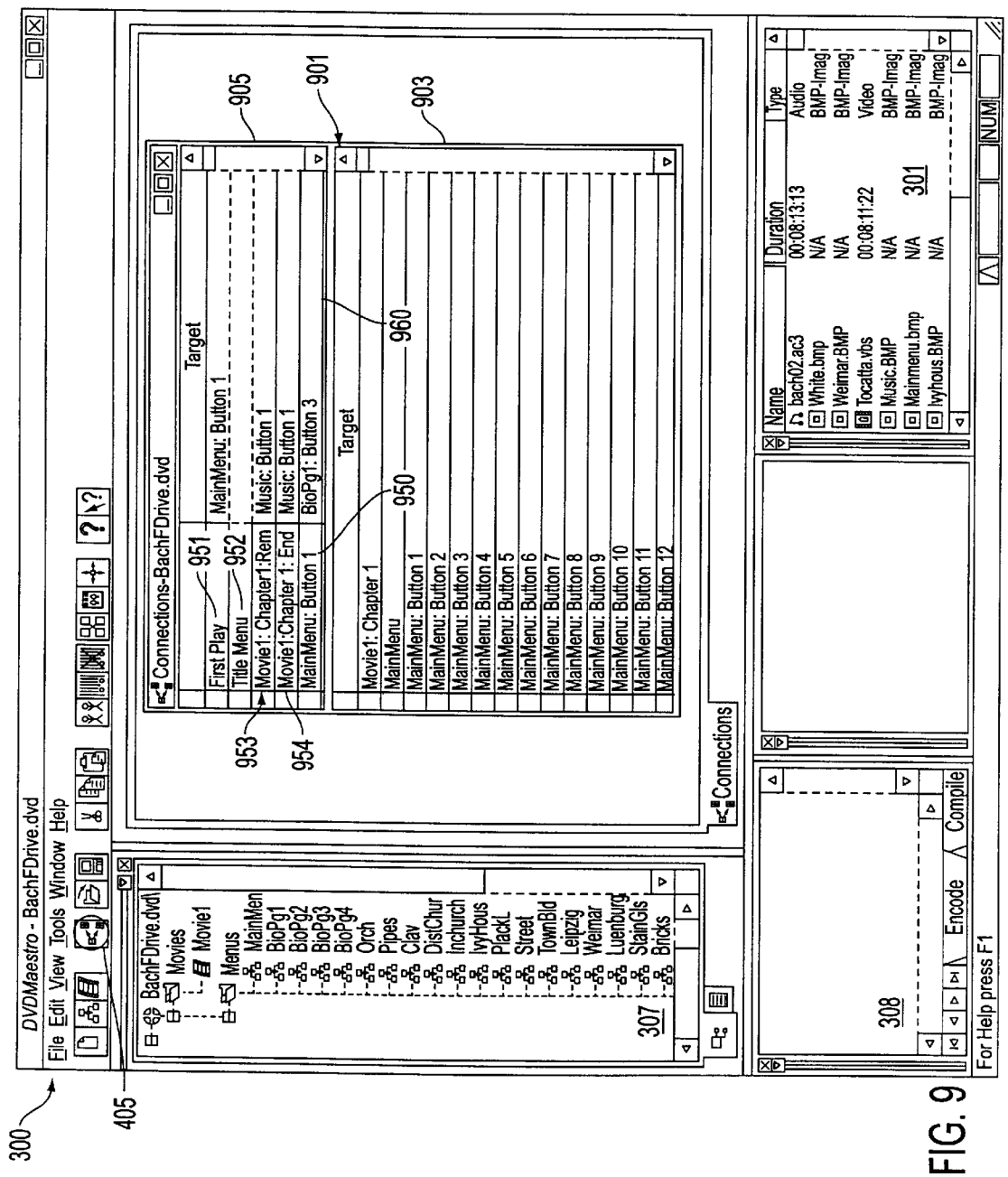
FIG. 9 is a screenshot of a preferred connections interface portion of the FIG. 2 authoring program, according to the invention.

The FIG. 9 screenshot illustrates a further selectable configuration of the FIG. 3 interface for linking together presentation data, menu layouts, buttons within menu layouts and available control functions of a DVD player. As shown, connection view 901 includes available targets panel 903 and linking panel 905. Linking panel 905 further includes available sources portion 950 and connected targets portion 960. While connections view 901 is active, assembled elements panel 307 can further be used as a selection means for navigating more quickly to a desired target within available targets panel 903.

Operationally, an author forms a link or "available connection" simply by copying (i.e. performing a copy action or dragging) a target from available targets portion 903 to a position in connected targets portion 960 that is in the same row as a desired source in available sources view 950. As with assembling a movie and menu layouts, an author can interactively remove, move or otherwise modify links in a conventional manner. For example, a link can be removed by deletion or a target can be moved or copied to another row in linking portion 905.

Figure 10:
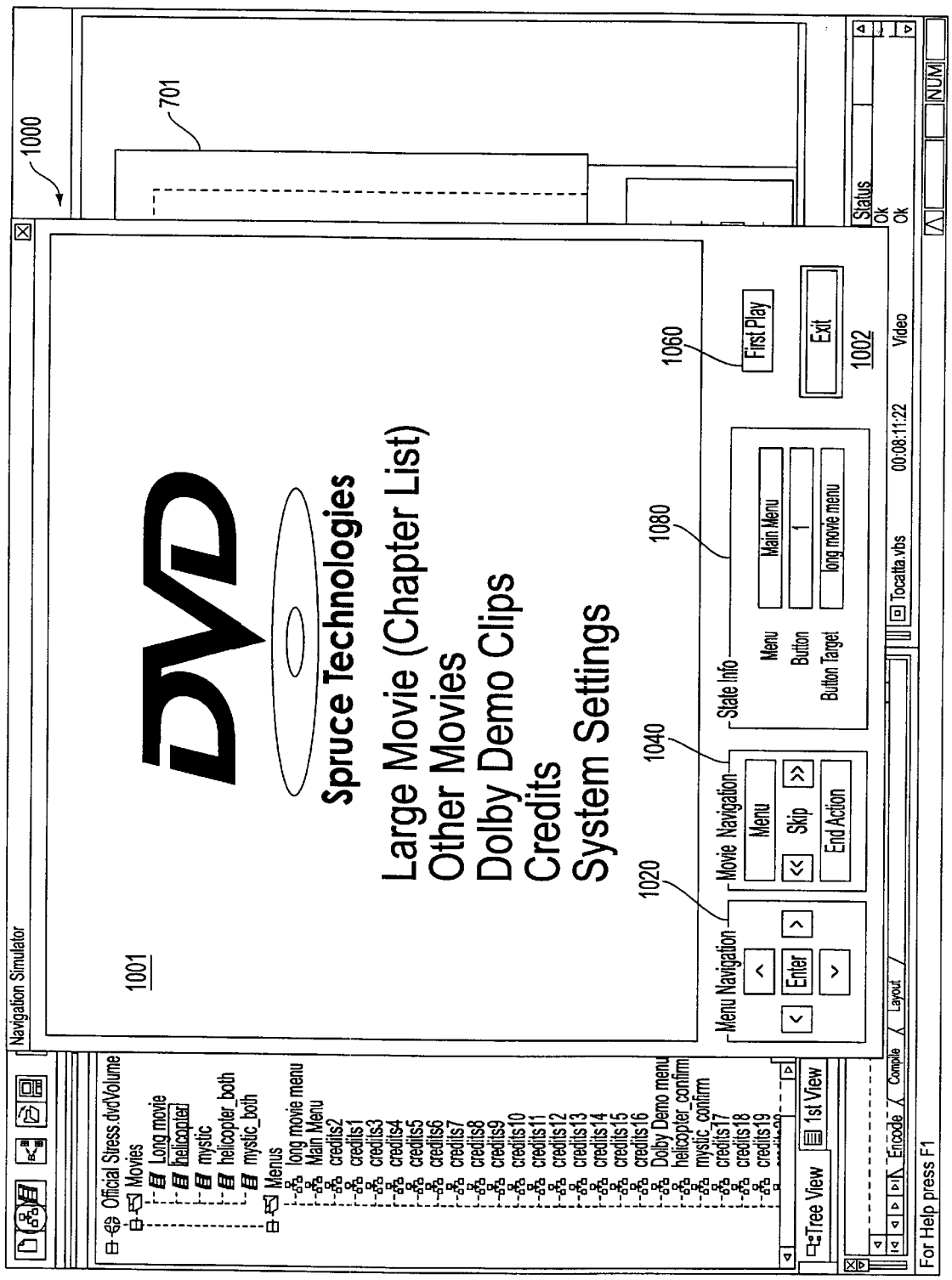
FIG. 10 is a screenshot of a preferred simulator interface portion of the FIG. 2 authoring program, according to the invention.

As with arranging performance data and forming menu layouts, an author has easy and complete flexibility in adding interactivity to a consumer's viewing experience. A DVD movie can be authored, for example, such that entry and exit from a menu can be controlled by any available event. Referring also to the FIG. 10 simulator window 1000, any menu button can further be linked to any DVD event, including but not limited to a chapter point (e.g. chapter point 953), the end of chapter playback or depressing a DVD remote control device menu button 1020 and 1040 (FIG. 10). A particular menu button can also be used as a target in multiple instances, as might be creatively appropriate.

Thus, for example, a consumer interface can be quickly and easily created which is interactively responsive ("context sensitive") to a consumer's actions. Stated alternatively, an interface can be authored such that, for example. the conclusion of a specific chapter playback or menu button activation will determine a next chapter playback, a next menu or even a next menu wherein an author-selected menu button is highlighted.

Among the reasons for such ease and flexibility is that, contrary to conventionally authored DVD movies, program chains are not created during the authoring process. Similarly, connections specified during authoring are not permanent ("hard wired"). Rather, program chains are not created until compilation and available connections are not fully resolved until playback, each according to additional abstractions of the invention, as will be further discussed herein.

Figure 11:
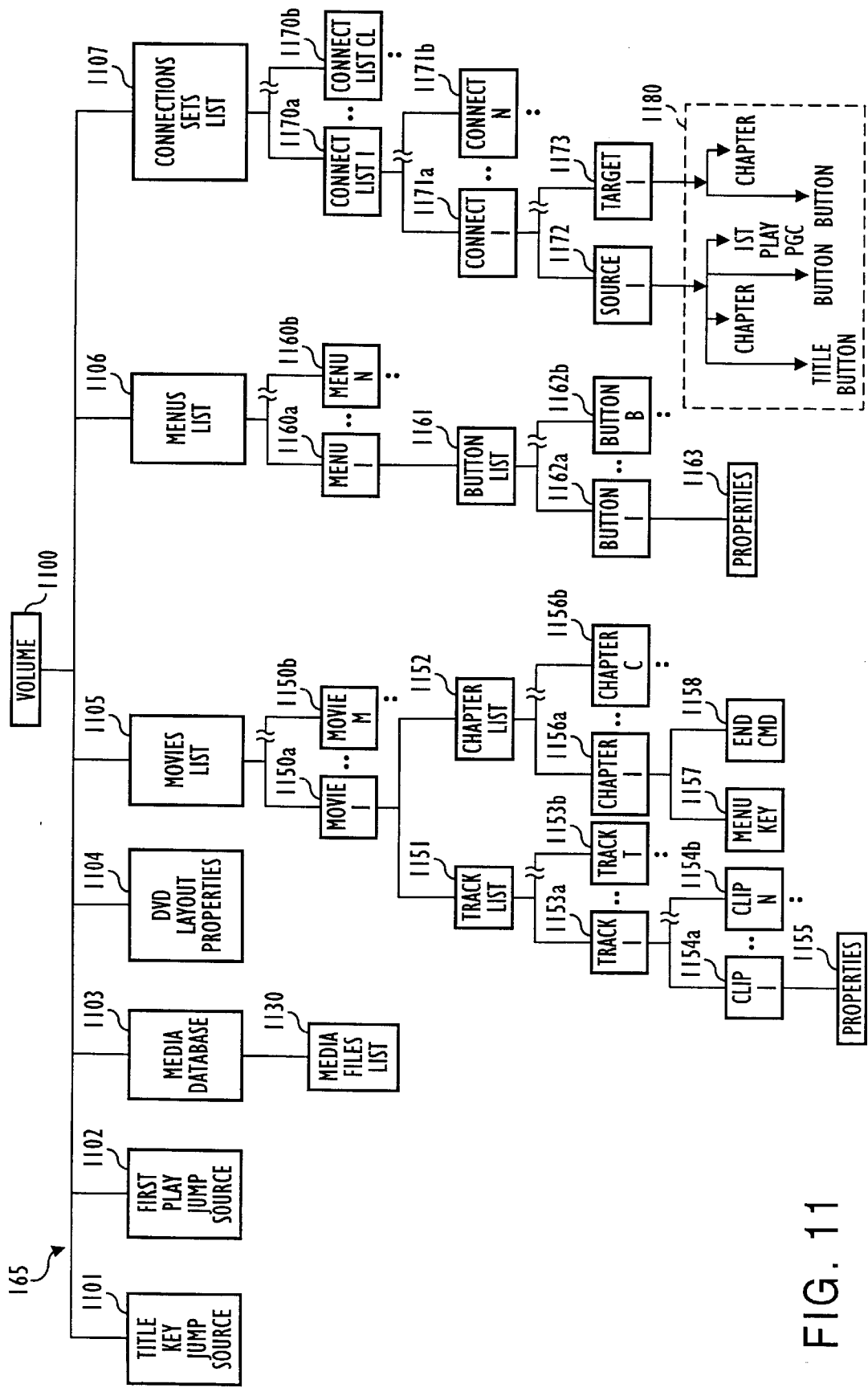
FIG. 11 is a functional block diagram of a preferred data management engine according to the invention.

The FIG. 11 block diagram illustrates the structure of a preferred data management engine 165 (FIG. 1) according to the invention. As illustrated, data management engine 165 only partially reflects the interface constructs and the structures of the DVD Specification. While reflecting interface abstractions (e.g. a movie, menu and connection based movie-title description) and DVD Specification requirements (e.g. first play jump source), data management engine 165 is further structured as a flexible network of data storage and distribution objects that also reflects other abstractions of the invention.

One further abstraction, for example, is a model of a DVD player, a consumer's controller and the compiled authoring instructions as an actively connection-switched network. Within this network, DVD program chains representative of action-oriented authoring instructions ("routers"), perform switching among available connections in response to DVD-player (i.e. consumer) instructions, thereby re-directing program flow and control. Control-receiving program chains then perform more localized tasks (e.g. such as displaying a menu). Stated alternatively, a router program chain resolves an available connection from a DVD-player control instruction to a receiving program chain, which again routes control or executes the instruction. Further abstractions also include models of program chains for performing a common base functionality in a same or similar manner using a derived common program chain structure.

Such an arrangement provides real world flexibility and efficiency. For example, data management engine 165 supports authoring flexibility with regard to source-target connections that are switchable. Further, given the power of even conventional computer systems, data management engine 165 is sufficiently robust to enable the interactive operation of interface 160*a* (FIG. 2) as well as minimal compilation times of compiler 170 (i.e. only milliseconds) without direct interface or DVD program specification 205 correlation. Data management engine 165 is therefore also readily adaptable to interface variations and further interfaces, as well as to compiler variations and other compilers supporting other DVD and non-DVD data storage and/or retrieval applications.

Referring again to FIG. 11 and with further reference to FIG. 2, data management engine 165 comprises a root volume object 1100, which manages data management engine 165 communication and storage. Volume object 1100 provides an interface for communicating messaged data to and from its component parts, including title key jump source 1101, first play jump source 1102, media database 1103, DVD layout properties 1104, movies list 1105, menus list 1106 and connections list 1107 (objects). Media database 1103 further includes media files list 1130, which stores pointers to media files referred to by the performance data arrangement as a result of authoring.

In addition, each of the presentation data objects (i.e. movies list 1105 and menus list 1106) and a connection sets list object 1107 contain links to other data management engine objects in the form of an object tree. More specifically, movies list 1105 is linked to movie objects movie-1 1150*a* through movie-M 1150*b*, wherein M is the total number of movies authored for storage on a single DVD-ROM ("movie title"). Each movie object contains a respective track list object 1151 and a respective chapter list object 1152. Each track list object 1151 contains respective track objects, track- 1153*a* through track-T 1153*b*, wherein T is the total number of tracks authored within a respective movie. Track-1 through track-T further contain clip lists, which in turn contain clip objects clip-1 1154*a* through clip-CL 1154*b* (and wherein CL is the total number of clips in a given track within a given movie). Finally, each clip object contains a respective clip properties object, as exemplified by clip object 1155.

Menu objects are structured in a manner similar to that of movie objects. Menus list object 1160 contains menu objects menu-1 1160*a* through menu-N, wherein N is the total number of menus authored for storage on a given DVD-ROM. Each menu object further contains a respective button list object (e.g. object 1161), each button list object contains a respective button objects (button-1 1162*a* through button-B I 162*b*) and each button object is linked to a button properties object (e.g. object 1163). B indicates a total number of buttons in a respective menu.

Finally, connections sets list 1107 contains respective connections lists (i.e. connect-list-1 1170*a* through connect-list-CL 1170*b*), wherein CL is the total number of connections lists authored for storage on a given DVD-ROM. Each connect-list is further linked to respective connections objects (i.e. connect-1 1171*a* through connect-CN), wherein CN is the total number of connections authored to facilitate flexible program flow and control. Each connections object (1171*a* through 1171*b*) represents an action-oriented switch between a respective source and a respective target (as indicated by source-pointer variable 1172 and target-pointer variable 1173), as will be discussed further herein.

Where applicable, each object includes an indexed object list having a pointer to each connected dependent object (i.e. an object "further down the tree" as illustrated), as well as a totals variable. The object list is updated to include new dependent objects as these objects are created ("instantiated") to reflect, for example, an added chapter point or menu. Dependent objects are similarly removed from the object list according to authoring deletions. Totals variables are also updated during authoring to reflect each corresponding dependent object instantiation and deletion. Undo and redo operations are handled in a conventional manner using authoring instructions which are further conventionally stored within respective objects during each authoring session.

Using this structure, data management engine 165 breaks down or filters control data generated during authoring into its basic component parts for storage in a corresponding object's indexed data list. These basic component parts are then retrieved by authoring engine 160, or retrieved and reconstructed into an applicable form by compiler 170, as needed.

Operationally, data management engine 165 receives messages from authoring engine 160 in response to and reflecting each author modification of a performance assembly, menu layout or connection. Volume 1100 receives the message, polls its contained-objects list for a recipient object according to the message type, and sends the message to the matching recipient object. If the message includes a reference to a title key source or a first play source (which is author-slectable in connections view 901), then volume 1100 sends the message respectively to either title key jump source 1101 or first play jump source 1102. Upon receipt, title key jump source 1101 or first play jump source 1102 will accordingly store included data, delete stored data or modify stored data.

If a received message includes a reference to a video, audio or subtitle file, then volume 1100 sends the message to media database 1103. If the message contains an instruction to add a data element, then media database 1103 stores the data (which will include a pointer to a media file) in media files list 1130. If the message contains an instruction to delete a stored pointer, then media database 1103 deletes the pointer. If the message contains an instruction to modify a stored pointer (e.g. if the file was moved to a new location), then media database 1103 locates and replaces the file pointer. Media database 1103 further updates its totals variable to reflect additions and deletions.

If a received message type relates to the content of a movie arrangement, menu layout or connection, then volume 1103 sends the message respectively to movies list 1105, menus list 1106 or connections list 1107. Each of movies list 1105, menus list 1106 and connection sets list 1107 operates similarly to objects described thus far. Each parses through a received message for included control information, sends the message respectively to a corresponding movie object, menu object or connections list and adjusts its totals variable as needed.

A movie message, for example, will then progress down through the movie object tree, and, depending upon the message type, will be filtered, by track list 1152, track-1 1153*a* and then handled a matching clip, or will be filtered by chapter list 1152 and then handled by corresponding chapter or by a clip properties object (i.e. as illustrated). Menu layout data will similarly progress (as illustrated) down through the menus list tree, being handled by a matching menu properties object, and connections data will progress down the connection sets list tree until it is handled by a connection object (with reference to its source pointer or destination pointer variables). Upon receipt, a clip properties, menu key, end key, menu properties or connection object will handle the message and store included data, delete stored data or modify stored data in a similar manner as with media database object 1103.

Each respective storage object stores authoring modifications in a sequentially indexed list according to its type (i.e. each object name is illustrated to reflect the data type the object stores). Thus, for example, chapter points within a movie are stored from a first chapter point during playback to a final chapter point in the movie. (Playback will however, be determined by authored connections.) The list accommodates added, inserted or deleted data interactively by expanding or contracting about the addition, insertion or deletion point.

While other data structures might be utilized, interactively adjusted indexed lists and limited object definitions, using even a minimally equipped computer, are sufficiently robust to accommodate an author's input rate, given the relatively small amount of data stored in each list. Alternative structures that might be used, for example, include but are not limited to a lesser number of objects each containing a less restricted dataset and/or the addition of summary objects for storing total numbers of menus, buttons and system other status and/or statistical information. Such arrangements however, have been found to add complexity with only moderate gains in application-specific operational characteristics. Alternative data structures, including but not limited to multi-dimensional arrays, multiple queues and linked lists stored locally and/or remotely, present similar tradeoffs.

Data management engine 165 returns stored data to authoring engine 160 in a manner essentially the reverse of that for storing data. Volume 1100, upon receipt of a request for stored data, parses the request call for a data type, searches its contained objects list for a corresponding object, and forwards the request to title key jump source 1101, first play jump source 1102, media database 1103, DVD layout properties list 1105, movies list 1106, menus list 1107 or connection sets list 1107. Movies list 1105, menus list 1106 or connection sets list 1107, upon receipt of such a request, parses its to available objects list and forwards the message correspondingly to a movie object, menu object or connection list object, and so on, until the message is received by a last recipient object. The last recipient object then retrieves the requested data and sends the data in the reverse direction of request receipt until the data reaches volume 100. Volume 1100, upon receipt of the data, sends the requested data to authoring engine 160. (Error handling and messaging functionality are otherwise handled in a conventional manner.)

Data management engine 165 further responds to queries from authoring engine 160 for purposes such as totaling the number of data elements of a given type or for reviewing the contents of a particular object's data list. As with data storage and retrieval above, data management engine 165 receives a call from authoring engine 160 requesting information. Volume 1100 parses the message, polls its available objects list and sends the message to a corresponding object. For objects linked to a tree-structure, such as movies list 1105, menus list 1106 and connection sets list 1107, the message is forwarded down through respective objects as already discussed, and a last recipient object will respond. If the message requests, for example, a total number of data elements of a given type, then a last recipient will either poll its totals variable or, if necessary, poll its data list for corresponding data, count the number of corresponding occurrences and return a response including the total. The response is sent back through the tree structure to volume 1100, which sends the message (including the total) to authoring engine 160. Given the relatively small number of objects, alternatives (such as asynchronous multiple-messaging and, in particular, broadcast messages) add some expediency, but with unnecessarily added complexity.

As with the authoring engine interface objects, the object types, inter-object messaging protocol and data objects utilized in data management engine 165, in view of the disclosure herein, will be apparent to those skilled in the computer arts. Preferably, available object libraries from Microsoft® are utilized. For example, the preferred available objects and data lists utilize Standard Template Libraries and, in particular, Expandable Indexed Buffered/Vectored Lists. Such objects provide robust response with the flexibility of expandable lists and indexed vectors for easy lookup in light of the typically small number of objects and datasets, among other factors. As noted earlier however, use of an object-oriented architecture and/or the specific data structures are not essential and many conventional alternatives can be utilized.

As discussed, the particular arrangement of objects of the preferred data management engine 165 is preferred according to its flexibility, performance and adaptability among other factors. It should be noted therefore, that any number of modifications will be apparent according to the teachings and within the spirit and scope of the invention.

FIGS. 12a through 15, with reference to FIGS. 2 and 11, illustrate compilation according to a preferred embodiment of the invention.

Figure 12A:
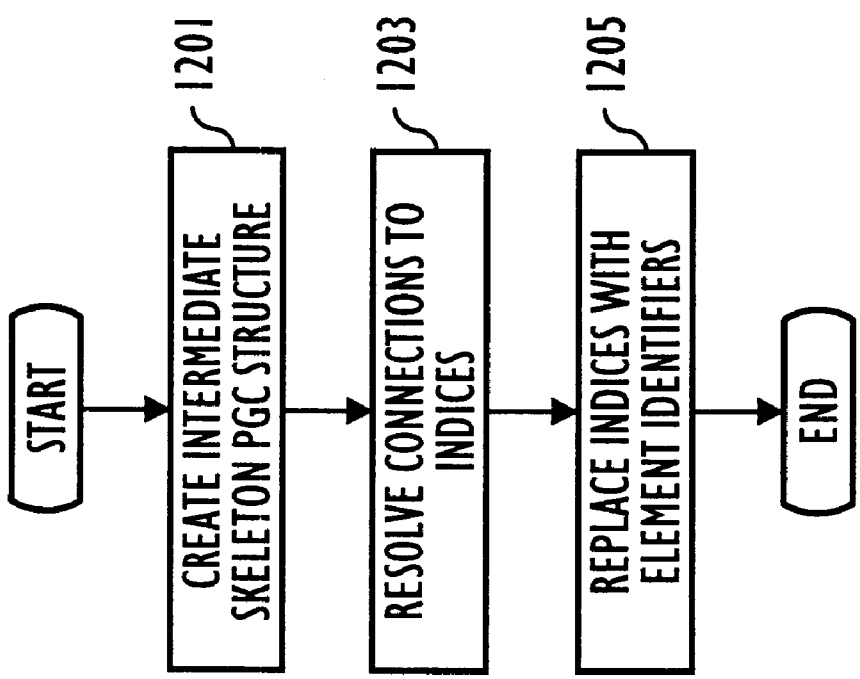
FIG. 12a is a flowchart showing generally the operation of a preferred compiler according to the invention.

As shown generally in FIG. 12a, compiler 170 (FIG. 2) preferably operates on data entered through the authoring process into the interface 160a of authoring engine 160 (FIG. 2) and stored by data management engine 165 in three stages. In step 1201, compiler 170 builds an intermediate skeleton-form PGC layout data structure. The skeleton-form PGC layout data structure is preferably formed according to DVD program code segment ("program chain" or "PGC") abstractions and a network abstraction according to the invention, utilizing only summary data gathered from data management engine 165. Broadly stated, each PGC abstraction is preferably comprised of pre-determined command combinations, wherein the number of PGCs of a given type and the number of command combinations of a given type (e.g. button command combinations) are determined according to either a default value (e.g. typically one PGC) or according to the number of corresponding authored element types. (e.g. the number of menu buttons in a given menu).

In step 1203, compiler 170 resolves source-target connections as indices to source and target identifier information within data management engine 165. In step 1205, compiler 170 replaces the indices with identifier information which is retrieved by further querying data management engine 165.

Figure 13:
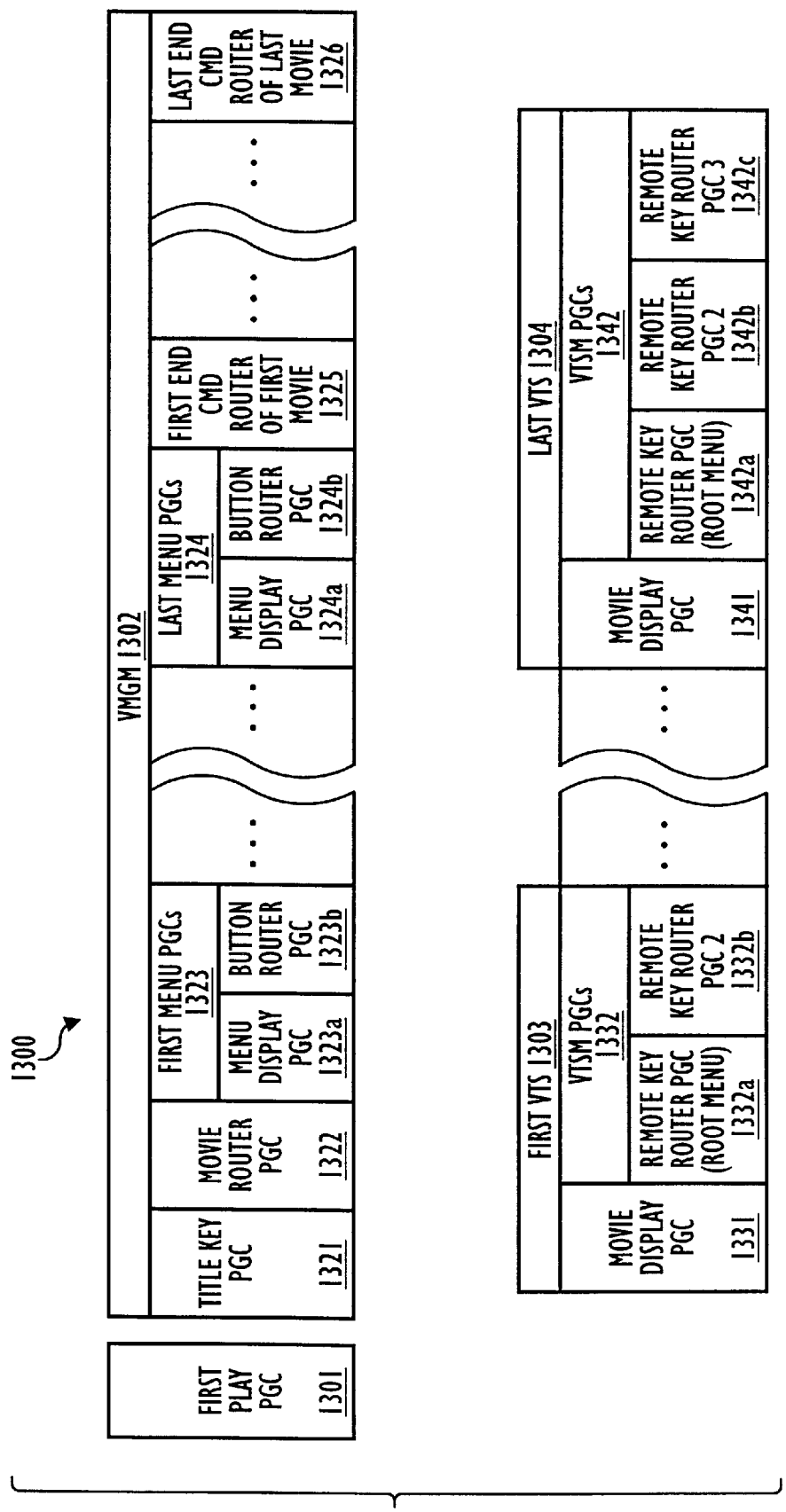
FIG. 13 is a block diagram showing the format of a preferred PGC layout structure according to the invention.

FIG. 13 illustrates a preferred PGC layout structure according to the invention. As shown, the PGC layout structure is divided into a single first play PGC space 1301 (in accordance with the DVD Specification), a single video manager ("VMGM") domain 1302, and one or more video title set ("VTS") domains (e.g. 1303 and 1304) according to the number of movies in the movie title.

The preferred VMGM domain PGC layout structure includes a single title key PGC abstraction, 1321 and a single movie router PGC abstraction 1322. Thereafter, the VMGM PGC structure includes 2 menu PGC abstractions (e.g. 1323a and 1323b) for each authored menu and a single PGC abstraction for each end command (in each movie) that an author for which an author has specified a connection. As will be discussed further, each menu PGC abstraction pair includes a menu display PGC (e.g. 1323a and 1324a) and a menu button router PGC (e.g. 1323b and 1324b).

Each VTS domain PGC layout structure (e.g. 1303) includes a movie display PGC 1331 and a video title set menu ("VTSM") area 1332. VTSM area further consists of from one to four remote key router PGCs (e.g. remote key router PGCs 1332), depending upon the number of different remote key commands necessary, given the preferred layout structure, to realize the chapter target connections selected using connection view 901. More specifically:

number of remote key router PGCs in a given VTSM= total number of chapter points in a corresponding movie/25 (rounded, if a non-integer, to a next higher integer value).

In each case, an attempt has been made to minimize the number of PGCs without detrimental impact on flexibility. Thus, while the number of PGCs is as indicated above, complete authoring flexibility with regard to connecting menus, menu buttons and presentation data without concern for limitations of the DVD programming specification 207 (FIG. 2) is provided. Further, the practical impact of resultant limitations is also minimized.

For example, the number of remote key router PGCs per VTSM area calculation reflects that each chapter point abstraction requires more than four commands. This in turn reflects that only one hundred twenty eight commands are allowable in a single PGC chain in accordance with the DVD programming specification 207. While not essential, placing each abstraction completely within a separated chains and in equal numbers throughout like chains provides an efficiently symmetrical structure. Since DVD programming specifications 207 provide for up to ninety nine chapter points per movie, a maximum of four PGC abstractions is required without detrimental impact in terms of connectability. Considering the same parameters and calculations for menus however, it is seen that only twenty five menu buttons are available per menu without limitation on connectability. In practical terms however (i.e. displaying a menu on a conventional television set), this number does not present any practical detrimental effect.

The use of consecutive locations in the PGC layout structure greatly simplifies the task of finding specific PGCs relating to specific data types and further for resolving PGC connections. A movie title PGC will always be the first element, a movie router PGC will always be the second element, and a display menu PGC can always be located merely by adding a known constant plus two times the menu number, etc.

Those skilled in the art will appreciate however, in view of the discussion herein, that the PGC abstractions provide for other than consecutively arranged elements as an indexed list in memory 120 (FIG. 1). Such alternatives, for example, include but are not limited to multiple lists, queues and/or multi-dimensional arrays stored in memory, in other media, and/or in more than one media either locally or in a distributed fashion, as with data management engine 165. Such methods can be useful where more than one authoring location or other distributed environments are utilized.

Figure 12B:
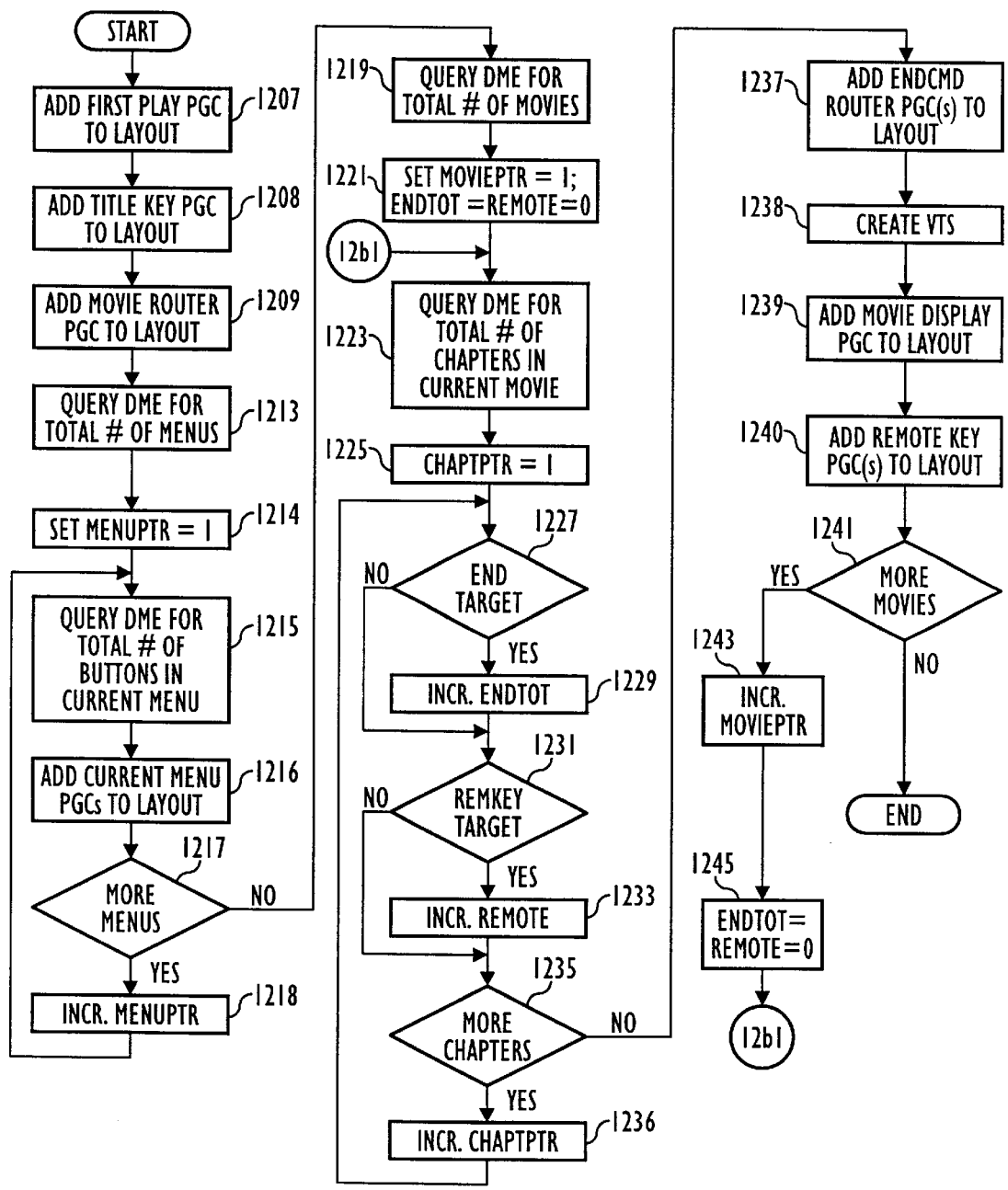
FIG. 12b is a flowchart showing how a compiler according to the invention preferably constructs a skeleton-form PGC layout structure.

The FIG. 12b flowchart, with reference to FIG. 13, shows in greater detail how compiler 170 constructs a preferred PGC layout data structure in an initial skeleton form. As shown, compiler 170 begins by storing a first play PGC abstraction, a title key PGC abstraction and a menu router PGC abstraction into PGC layout structure 1300 (FIG. 13) in steps 1207, 1208 and 1209 respectively. Next, in step 1213, compiler 170 queries data management engine 165 for a total number, MenusTot, of menus authored and, in step 1214, initializes a menu pointer, MenuPtr. In step 1215, compiler 170 queries data management engine 165 for a total number, ButtonsTot, of buttons authored in a current menu (e.g. initially, a first menu). MenusTot will specify the number of predetermined menu display and menu button router PGC abstractions (i.e. "menu PGC abstraction pairs") that compiler 170 will add to the structure, while ButtonsTot will specify the number of commands that compiler 170 will add to each PGC of a current menu PGC abstraction pair.

In step 1216, compiler 170 adds a menu PGC abstraction pair to VMGM PGC structure 1302 (FIG. 13) corresponding to the existence of and the number of buttons in a current authored menu (e.g. initially, a first menu). If, in step 1217, one or more menus are not yet added to VMGM PGC structure 1301, then in step 1218, compiler 170 increments the menu counter and returns to step 1211.

At this point, compiler 170 lacks any authoring information other than MenusTot and a respective ButtonsTot value for each current menu. A similar same lack of further authoring details will also exist for other PGCs in the skeleton-form, PGC layout structure. The preferred PGC and network abstractions of the invention however, enable compiler 170 to accommodate missing authoring details merely by inserting null values ("no-ops") into the commands of the abstracted PGCs for unknown connection information (i.e. source- target identification information). As discussed, compiler 170 will preferably resolve these no-ops later in compilation. These abstractions further enable menu PGCs to be created independently of movies and movie arrangements. Thus, independently created/conceived menu PGCs provide extensive flexibility, allowing an author to link any available menu button of any menu to any potential target using a user-friendly interface such as the preferred connection view 901.

If instead, in step 1217, all authored menu layouts are reflected by corresponding menu PGC abstraction pairs, then compiler 170 proceeds to step 1219. In step 1219, compiler 170 queries data management engine 165 for the total number, MovieTot, of movies, which compiler 170 will use to create end commands, VTSs and VTS contents. In step 1221, compiler 170 initializes a current movie pointer ("MoviePtr"), as well as two counters, "EndTot" and "Remote". Compiler 170 will use EndTot to count the number of available end-of-chapter conditions in each movie for which an author has specified connections and will use Remote to count the number of available playback interruption conditions (i.e. by a user pressing a DVD-player control, typically on a remote control device) for which an author has specified connections.

In step 1223, compiler 170 queries data management engine 165 for the total number of chapters ("ChapterTot") in a current movie (e.g. initially, the first movie) and, in step 1225, initializes a current chapter pointer ("ChapterPtr"). If, in step 1227, the author has specified a target for the current chapter, end-of-chapter condition (i.e. using connection view 901), then, in step 1229, compiler 170 increments EndTot; otherwise, compiler 170 proceeds to step 1231. Similarly, if, in step 1231, the author has specified a target for the current chapter, remote-control key playback interruption ("remote-key") condition, then, in step 1233, compiler increments Remote; otherwise, compiler 170 proceeds to step 1235.

The existence of authored connections is determined similarly for both end-of-chapter and remote-key conditions. Preferably, objects 1101–1163 (FIG. 11) contain actual source and target identifier information (i.e. corresponding to authored sources and targets), while the connection objects (e.g. 1171a) contain pointers to data stored by these objects. Stated alternatively, as a new potential source is authored, a connection object is instantiated, including a source pointer that points to the potential source and a null-value target pointer; if an author later connects such a source, then the corresponding connection-object target pointer value is replaced by a pointer to the target object. (Subsequent editing by an author correspondingly deletes or instantiates a connection object and/or changes a source pointer or target pointer value.)

Therefore, compiler 170 determines the existence of a connected end command by first querying each connection object for a source pointer pointing to the currently selected chapter-object. Once found, compiler 170 checks the corresponding target pointer. A null-value target pointer indicates an unconnected end command while a non-null-value target pointer indicates the existence of a connection. Remote key (i.e. "menu key" in FIG. 11) connections are similarly determined by finding an identifier in a current chapter menu key object (e.g. 1157), finding the corresponding source pointer in one of the connection objects, and then querying the connection object for the existence of a corresponding non-null-value target pointer.

Those skilled in the art, in view of the foregoing, will appreciate that considerable variation of the above structure will provide the same, related or similar functionality. For example, identifiers, labels and even complete movie tree, menu tree and/or other objects could well be contained within or duplicated within the connections-tree (i.e. objects 1107–1173). A single connection object could also be used (i.e. having a single list of all connections), as could connection objects that remain despite the deletion of a source. Other variations are also anticipated. The current structure is however, preferred in that it provides a compilation time of only a few milliseconds, minimizes memory usage and further facilitates debugging, emulation, simulation and overall symmetry by separating these objects (and their contained data). In simulation, for example, the restrictions imposed by the DVD Specification are not controlling and simulation can therefore more efficiently utilize authoring data directly from the preferred, non-integrated data management engine 165 object structure.

Returning now to FIG. 12b, if, in step 1235, more chapters remain in the current movie, then compiler 170 increments ChapterPtr and returns to step 1227; otherwise, compiler 170 proceeds to step 1237. In step 1237, compiler 170 adds a 1–4 PGC, end command router PGC abstraction to layout structure 1300 (FIG. 13). In step 1238, compiler 170 creates a VTS domain for the current movie (i.e. including a VTSM), adding to the VTS domain a movie display PGC in step 1239 and adding a 1–4 PGC, remote key PGC abstraction in step 1240.

If, in step 1241, more movies remain in the current movie title (i.e. tested by comparing MovieTot with MoviePtr), then compiler increments moviePtr in step 1243, re-initializes EndTot and Remote in step 1245 and returns to step 1223. Otherwise, formation of a PGC layout structure in skeleton form has been completed.

Figure 12C:
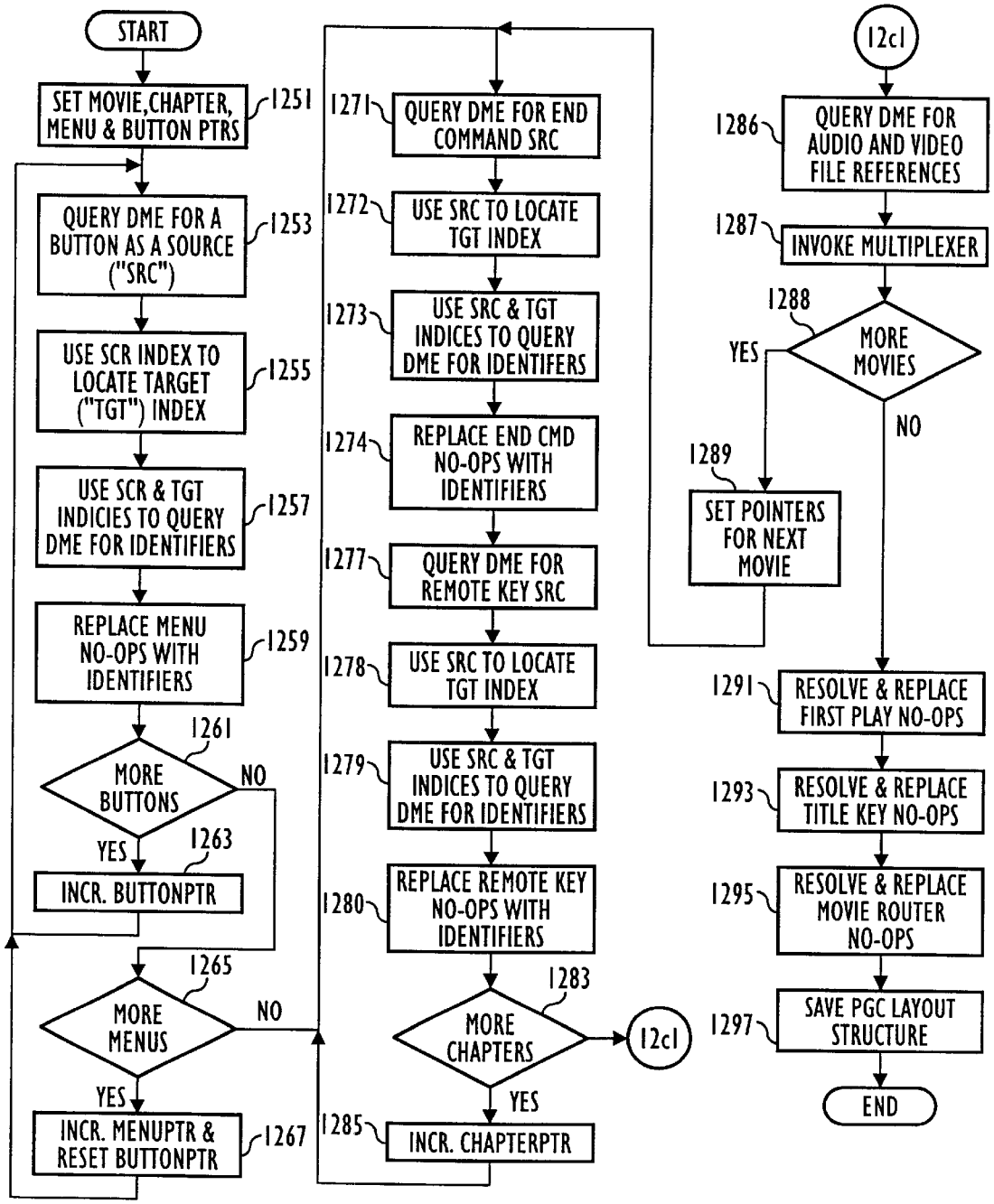
FIG. 12c is a flowchart showing how the compiler preferably resolves source-target connections and substitutes those connections for null operations in a preferred skeleton-form PGC layout structure, according to the invention.

The FIG. 12c flowchart with reference to FIG. 11 shows how compiler 170 replaces the no-ops in (skeleton form) PGC layout structure 1300 with indices (i.e. source or target pointers) to respective sources and targets, and then further replaces the indices with element identifiers. In step 1251, compiler 170 initializes a movie pointer ("MoviePtr") to a first movie, a chapter pointer ("ChapterPtr") to a first chapter, a menu pointer ("MenuPtr") to a first menu and a button pointer ("ButtonPtr") to a first button.

In step 1253, compiler 170 queries data management engine 165 (i.e. connection-objects) for a source-pointer to a next (initially, a first) author-connected button. As discussed earlier, the connection object checks its source-pointer for a corresponding source having a corresponding non-null-value target pointer. Since specific connection values (rather than the existence of a connection as with FIG. 12b) are required in this case, the query utilized results in the return of such a source-pointer. In step 1255, compiler 170 uses the returned source-pointer to query data management engine 165 for the corresponding target-pointer and, in step 1257, compiler 170 uses the returned indices to query data management engine 165 (e.g. via volume 1100, menu- 1 1160a and button list 1161 to button-1 1162a) for the source and target identifiers corresponding to the source and target pointers. Then, in step 1259, compiler 170 replaces the current button command no-ops (of the current menu PGC abstraction pair) with the returned identifiers.

If, in step 1261, more buttons remain unresolved in the current menu, then compiler 170 increments ButtonPtr in step 1263 and returns to step 1253; otherwise, compiler 170 proceeds to step 1265. If, in step 1265, menus remain unresolved, then compiler 170 increments MenuPtr and resets ButtonPtr to one in step 1267, and then returns to step 1253; otherwise, compiler 170 proceeds to step 1271.

Having resolved and replaced all menu button no-ops, compiler 170 next resolves all chapter end-command and remote-key PGC abstraction no-ops in a similar manner. Compiler 170 queries data management engine 165 for a (next connected) current chapter end command source-pointer in step 1271, uses the returned source-pointer to query data management engine 165 for a corresponding target-pointer in step 1272, uses the pointers to query data management engine 165 for corresponding identifiers in step 1273 and replaces corresponding layout structure 1300 PGC commands with the returned identifiers in step 1274. Similarly, compiler 170 queries data management engine 165 for a (next connected) current remote key source-pointer in step 1277, uses the returned source-pointer to query data management .engine 165 for a corresponding target-pointer in step 1278, uses the pointers to query data management engine 165 for corresponding identifiers in step 1279 and replaces corresponding layout structure 1300 PGC commands with the returned identifiers in step 1280.

If, in step 1283, more chapters remain unresolved, then compiler 170 increments the chapter pointer in step 1285 and returns to step 1271. If instead, no chapters remain unresolved in the current movie, then compiler 170 proceeds to step 1286. In step 1286, compiler 170 queries data management engine 165 (i.e. via volume 1100 to media database 1103 of FIG. 11) for all audio and video file references which reference the current movie. In step 1287, compiler 170 invokes multiplexer 185, which retrieves the referenced audio and video files and outputs a resultant multiplexed data file in a conventional manner and in accordance with the DVD disk format specifications 205 (FIG. 2) of the DVD Specification.

If, in step 1288 more movies remain unresolved in layout structure 1300, then compiler 170 resets pointers for the next movie and first chapter in step 1289 and returns to step 1271. Otherwise, compiler 170 (in a similar manner) resolves first play, title key jump source and menu router no-ops respectively in steps 1291, 1293 and 1295. Then, in step 1297, compiler 170 saves the PGC layout structure as a stored file.

With regard to FIG. 12b and 12c, total authored element values (i.e. such as MenusTot and ButtonsTot) are maintained on an ongoing basis in a corresponding list object or the functional equivalent of a list object as already discussed. For example, movies-list object 1105 (FIG. 11), in addition to a list for containing references to all instantiated movie objects, also contains a variable for updating the total number of movies in a current movie title during the course of one or more authoring sessions. Similarly, button-list object 1161 contains a list of instantiated button objects (e.g. 1162a through 1162b) as well as a variable indicating the total number of buttons in menu-1. Other list objects similarly include ongoing totals which are updated during the course of authoring. One reason is that some early-generation DVD-players limit the available memory space for storing PGCs, which correspondingly limits the number of elements (e.g. menus, menu buttons and chapters) that the invention permits to be authored. These limits and/or current totals are therefore selectively conveyed to an author through interface 160a. Ongoing totals are also beneficial in that no time periods are required during compilation for calculating such totals.

As will be understood by those skilled in the art however, total values might become unimportant for other than compilation purposes as DVD-players are manufactured with increasing resources in conformance with the current DVD Specification, in accordance with expanded DVD capabilities and in accordance with the requirements of non-DVD systems. In such cases, totals can alternatively be calculated during compilation.

The use of preferably pre-determined PGC abstraction types comprising preferably pre-determined command combinations and the preferred PGC layout structure are thus factors in providing a maximized authoring flexibility and efficient compilation among other benefits. Available connections remain completely flexible during authoring and, in fact, until substitutions are made for no-ops during compilation. The preferred structures of PGC abstractions further add to compilation efficiency, since a skeleton can be formed with only summary authoring data, and then authoring details can be quickly added thereafter.

Figure 14:
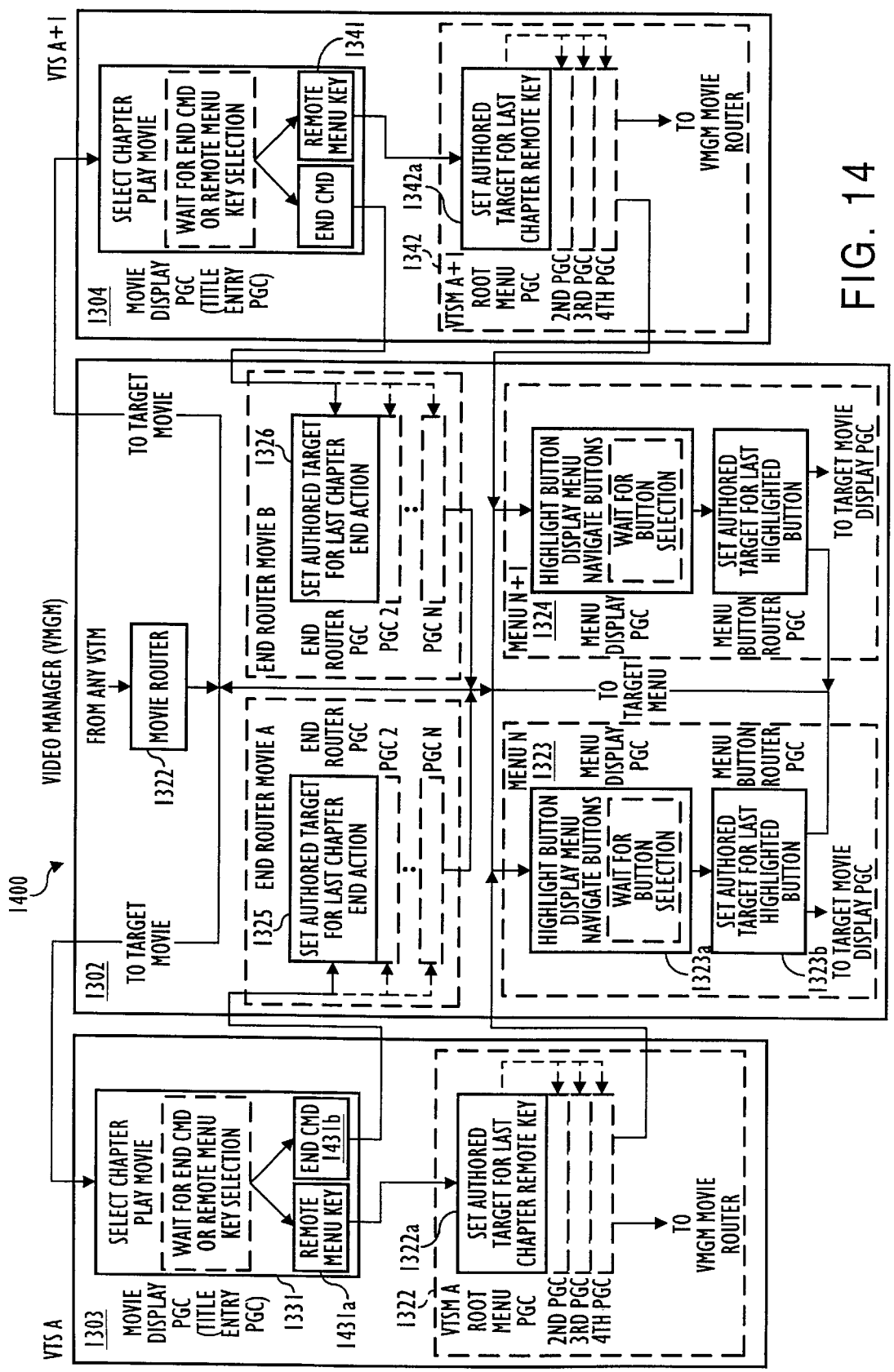
FIG. 14 is a functional block diagram showing a preferred connection-switching abstraction according to the invention.
Figure 15:
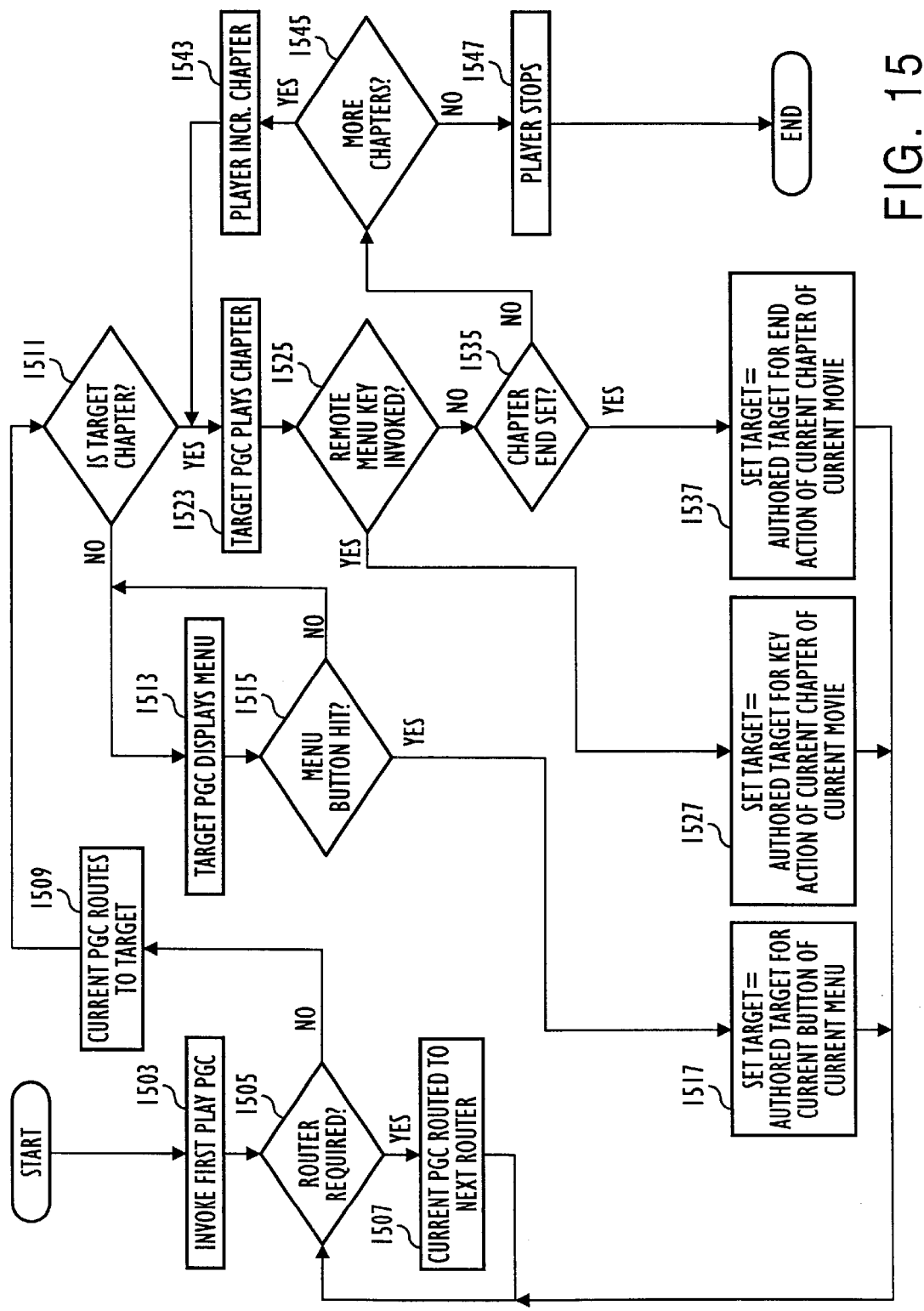
FIG. 15 is a flowchart showing a preferred operation of the connection-switching abstraction of FIG. 14, according to the invention.

FIGS. 14 and 15, with reference to FIG. 13, illustrate a preferred network or "connection-switching" abstraction according to the invention. The connection-switching abstraction, while operationally active only during playback of a movie-title, is also a factor in determining PGC abstractions produced by compiler 170 as well as the movie, menu and connection movie-title abstraction utilized by data management engine 165, interface 160*a* and authoring engine 160 (FIG. 2).

Details of the DVD Specification including but not limited to multiplexed data stream and DVD player configurations, data formats, protocols and loading of data are known to those skilled in the art and will therefore be discussed only to the extent required for an understanding of the invention.

DVD programming specifications 207 (FIG. 2) provide that PGCs can reside (along with the corresponding presentation data) in virtual structures including a first play space, a video manager ("VMGM") and any of 99 video title sets ("VTSs"), each of which includes a video title set menu space ("VTSM"). Among the limitations of this virtual structure however, is first that a PGC in an initial VTS or VTSM cannot directly trigger (i.e. jump to, using a DVD jump command) a PGC stored in another VTS (or VTSM). For example, while a PGC in an initial VTS can "playback a chapter of presentation data" and the conclusion of chapter playback can trigger a "followup" PGC, the followup PGC cannot be stored in a different VTS. Similarly, an initial PGC used to respond to DVD consumer menu-button activation cannot trigger a second PGC which is stored in a different VTS. A further relevant limitation is that the format of performance data must remain constant within a given VTS. So, for example, a video data stream having one aspect ratio cannot be stored in the same VTS with another video data stream having a different aspect ratio.

The FIG. 14 functional diagram illustrates how the preferred connection-switching abstraction provides a flexible and robust functional superstructure within which movie-title, DVD-player and interactively occurring consumer-control events are routed and executed. In the figure, VTS-A 1303 and VTS-A+l exemplify any two different VTSs which have been created during compilation of a movie-title. It should also be noted that the illustrated connection arrows only denote the "path" from one box (i.e. PGC abstraction, PGC or command-set) to another that can result from an author's use of connection view 901 (FIG. 9). Thus, fewer connections than those illustrated might be authored and each path from one box to another is accomplished individually using a single "jump command" or a single transfer of control by a DVD-player. (The use of multiple connected arrows and shared arrows is used only for clarity sake, since the alternative use of individual arrows between each pair of boxes might otherwise obscure the invention.)

Within each VTS, only a movie display PGC abstraction operates as a "control PGC" (i.e. directly controls menu and/or movie display). For example, VTS-A 1303 includes movie display PGC abstraction 1331 and (within its VTSM domain 1322) remote key PGC abstraction 1322*a*. Movie display PGC abstraction 1331 comprises a single PGC which includes a command-set ("pre-command") for selecting a chapter and initiating playback of the chapter, as well as an end command "cell command" that initiates routing upon the occurrence of an end-of-chapter-playback condition. Remote menu key 1431*a*, which denotes an automatic DVD player function, traps and forwards a remote-key condition (i.e. user depression of a remote menu key which interrupts playback). Remote menu key router PGC abstraction 1322*a* of VTSM-A 1322 sets the authored target for a corresponding remote menu key condition (i.e. where a consumer presses a remote menu key during playback) and then routes control to a corresponding movie PGC abstraction or menu PGC abstraction within VMGM 1302. Other VTSs (e.g. VTS-A+l 1304) are similarly structured for each movie within the current DVD movie-title.

Each remote menu key router PGC abstraction includes up to 4 PGCs to accommodate the up to 99 chapter points per movie limitation of the DVD Specification. The first remote menu key PGC is always assigned as a root menu and is always a hardwired (i.e. unalterable) target for any remote menu key condition (in accordance with the DVD Specification). Therefore, in order to provide for chapter dependent routing of a remote menu key condition, a DVD-player system register must first be queried for the last played chapter. Using the returned last played chapter information, program execution is then diverted to the corresponding authored remote menu key router PGC.

VTSM 1302 comprises the discussed menu display PGC (e.g. 1322) and menu button router PGC (e.g. 1323*b*) abstraction pairs (for providing menu control), as well as the remaining router PGC abstractions. More specifically, movie router PGC abstraction 1322 acts as a playback bridge between VTS domains, receiving control from a remote key PGC in a first VTS (e.g. remote key PGC 1322*a* of VTS 1303) and then forwarding control to a movie display PGC abstraction in second VTS (e.g. movie play PGC 1341 of VTS 1304). In contrast, end router PGC abstractions (e.g. 1325 and 1326) can be author-connected to route control from an end-of-chapter condition to either a selected chapter in a selected movie, or to a selected menu button in a selected menu.

As shown, a separate PGC is provided for each author-connected end-of-chapter condition. Each end command router PGC abstraction is paired with (i.e. responds to) a specific end command such that each end-of-chapter condition for a given movie will be routed from the end command to a unique end router PGC abstraction. Separate end command PGCs are required due to a flaw in current generation DVD-players whereby the last played chapter is not reliably available at the end of chapter playback. Upon correction of this flaw in future generation DVD-players however, end command routing can be accomplished in a manner consistent with remote menu key PGC abstractions (i.e. using only up to four end-command router PGCs per movie).

A menu display PGC abstraction (e.g. 1323*a*), when it receives control as a target and thereafter while a consumer continues to depress menu navigation buttons, effectuates control by highlighting a menu button and displaying the menu. If however, a consumer activates a menu button, then the DVD-player initiates the corresponding router PGC abstraction (e.g. 1323*b*), which routes control (i.e. according to an authored connection) to either a movie display PGC or to a menu display PGC.

For clarity sake, the first play PGC abstraction 1301 and title key PGC abstraction 1321 (FIG. 13) are not shown in FIG. 14. Each operates to transfer control to either a menu display PGC or a movie display PGC as with the end command router PGCs and menu router PGCs. First play PGC 1301 is stored in a separate DVD-player storage location, while title key PGC 1321 is stored in VMGM 1302.

While those skilled in the art will appreciate, in view of the discussion herein, that considerable variation might be utilized, iterative experimentation with different connection-switching abstractions and DVD players has revealed a number of considerations. For example, command execution delays will necessarily occur as a result of PGC execution and greater delays typically result from transfer of control between a VTS (e.g. 1303 and 1304) and VMGM 1302. Another example is that a delay occurring prior to the start of a movie is observed to be more acceptable than a similar delay during navigation through what can be a large number of menus. A still further example is that consistent delay periods for similar transitions is more acceptable than inconsistent delays for similar transitions.

Thus, the preferred connection-switching abstraction provides a generally symmetrical structure wherein delays are first minimized by source-router-target execution paths having a minimum number of PGCs and PGC commands. Movie display PGC abstractions are further placed similarly within each VTS, while menu PGC abstraction pairs are placed similarly within VMGM 1302. (Note that an author typically only connects the end command of a last chapter within any given movie, such that the DVD-player will continuously play all chapters with the movie before control is routed outside the corresponding VTS). In addition, movie router 1322 is only used for VTS-to-VTS transitions This reflects, for example, that inconsistent delay between movie-to-movie playback and menu-to-movie playback is more acceptable than imposing further delay on menu-to-movie playback or other alternatives. (For example, further distribution and/or re-distribution of movie and/or menu routing functions have been observed to produce subjectively less acceptable results.) In addition, movie router 1322 complexity and PGC length is therefore reduced. It should be understood however, that these already short delay periods will further decrease as advances are made in DVD-player technology and that the resulting decreasing importance of such considerations might well contribute to further connection-switching abstraction variations.

The FIG. 15 flowchart broadly illustrates the operation of preferred connection-switching abstraction 1400. In step 1503, first play PGC abstraction is invoked in response to insertion of a movie-title into a DVD-player. The first play PGC abstraction (i.e. now the current PGC abstraction) determines target information (i.e. a target identifier and, if needed, target parameters). If, in step 1505, a router is required, then, the current PGC abstraction routes the target information and control to a next router abstraction in step 1507 and operation returns to step 1511. If no router is required in step 1505, then, in step 1509, the current PGC abstraction routes the target information to the target PGC abstraction.

If, in step 1511, the target is not a chapter (i.e. playback of a chapter is not the resultant authored event) then the target displays a menu (i.e. according to the target information) in step 1513 and the DVD-player waits for a menu button to be selected (i.e. step 1513 through 1515 act as a wait loop). If, in step 1515 a menu button is selected, then the current PGC abstraction sets authored target information for the selected button in step 1517 and operation returns to step 1505.

If instead, in step 1511, the target is a chapter, then the target initiates playback of the chapter. If further, in step 1525, a consumer invokes the remote menu key during playback of the chapter, then the current PGC abstraction sets authored target information in step 1527 and operation returns to step 1505. If, in step 1525, the remote menu key is not invoked (i.e. the chapter plays uninterrupted to its conclusion) and a chapter end command target has been authored, then the current PGC abstraction sets the authored target information in step 1537 and operation returns to step 1505. If, in step 1535, a chapter end command target has not been authored, then operation continues in step 1545.

If, in step 1545, more chapters exist in the current movie, then the DVD player increments the chapter number in step 1543 and operation returns to step 1523. If instead, in step 1545, no more chapters remain unplayed in the current movie, then the player suspends playback and (in some models) switches itself off.

For clarity sake, the operation of preferred connection-switching abstraction 1400 will also be discussed, by way of example, with reference to FIG. 14. If, for example, an authored-connection for first play is set to begin playback of a first chapter of a first movie stored in VTS-A 1303, then upon insertion of the DVD movie-title into a DVD-player, movie display PGC abstraction 1331 will be invoked. Movie display PGC 1331 will select and initiate playback of the first chapter.

If the first chapter playback is interrupted by a remote menu key condition, then the DVD-player will automatically trap the condition (i.e. box 1431*a*) and will initiate the root menu PGC of remote menu key router 1322*a* of VTSM-A 1322. Assuming further that less than 25 chapters exist in the first movie, the root menu PGC of remote menu key router 1322*a* (i.e. now the current source PGC abstraction) will set the author-selected target for the first chapter remote menu key condition and will route control to either movie router 1322 or a menu display PGC (e.g. 1323 or 1324) within VMGM 1302. If movie router 1322 receives control, then upon receipt, movie router further routes control to the author-connected movie display PGC, in this case, movie display PGC 1341 of VTS-A+1 1304, which will set and initiates playback of the author-selected chapter of the VTS-A+1 movie.

If instead, playback of the first movie is not interrupted and only the last chapter of the first movie includes an author-connected end command, then the DVD-player will continue to play successive chapters of the first movie until the conclusion of the last movie. At the conclusion of the last movie, the DVD-player will execute cell command 1431*b* (i.e. end command), which will transfer control to the PGC in end router 1325 (in VTSM 1302) that corresponds with the chapter last chapter played, i.e. the last chapter of VTS-A movie. (Since, in this case, only one chapter in the VTS-A movie has a connected end-of-chapter playback condition, end router 1325 will include only the one corresponding PGC.)

Upon receipt of control from end command 1431, end router 1325 (i.e. now the current source) will set the corresponding author-connected target included in end router 1325. Assuming the target is the VTS-A+1 movie, end router 1325 will further route control to movie display PGC 1341 of VTS-A+1 1304, which will set and initiate playback according to the chapter of the VTS-A+1 movie set by end router 1325. (Since control is not being routed from one VTS to another VTS, movie router 1322 is not utilized.)

If instead, the current source PGC of end router 1325 (i.e. again, the only PGC in end router 1325 in this example) includes an author-selected connection to menu N 1323, then end router 1325 will set target parameters and will route control to menu display PGC 1323*a*. Menu display PGC 1323*a* will highlight the button of menu-N 1323 according to the received target parameters and will then display menu-N 1323. Menu display PGC 1323*a* will thereafter continue to be invoked by the DVD-player and will continue to highlight a button and display menu-N 1323 correspondingly with each successive uninterrupted (i.e. by consumer selection of a conflicting DVD control function) consumer depression of a navigation button. If however, the consumer next activates a displayed menu button, then the DVD-player will invoke menu button router PGC 1323*b*. Once invoked, menu button router PGC 1323*b* will set target parameters according to the author-selected connection for the activated button, and so on.

Attachment A attached hereto provides computer listings of preferred PGC abstractions source code according to the invention. For clarity sake, compilation has already been completed. Stated alternatively, the no-ops initially included in the skeleton-form PGC layout structure have been replaced by indices and the indices have been resolved to source and target identifiers using the discussed compiler and compilation methods.

As shown in attachment A, the preferred PGC abstractions utilize a number of DVD player registers. According to the DVD specification, each DVD player includes 16 general purpose registers ("GPs"), and 20 system registers ("SPs"). The GPs are functionally undefined and merely "available for use" by movie title control program PGCs. Conversely, the SPs have fully defined purposes consistent with DVD player operation and movie title control program interfacing.

The preferred GPs utilization and corresponding naming conventions according to the invention are indicated in the following chart. As shown, PGC abstractions exclusively utilize only 5 GPs, leaving a maximized number of remaining GPs available for adding further capabilities.

| Register | Referenced as | Description |
|---|---|---|
| GP10 | Stream Select | Bit 15 = Select audio stream on/off |
| | | Bit 14 = Select subtitle stream on/off |
| | | Bit 13 = Select angle stream on,off |
| | | Bits 10–12 = Audio stream number |
| | | Bits 7–9 = Angle stream number |
| | | Bits 0–6 = Subtitle stream number |
| GP12 | Target Movie Number | Stored number = Movie number |
| GP13 | Target Button Number | Stored number = Button number |
| GP14 | Target Chapter Number | Stored number = Chapter number |
| GP15 | Temporary Register | Stored number = value used with current PGC |
| SP7 | Last Chapter Played | DVD player fills the register with the number of the last chapter played |
| SP8 | Last Highlighted Button | DVD player fills the register with the number of the last highlighted button |

As illustrated by the register utilization chart, GPs are utilized by source PGC abstractions primarily for designating (i.e. resolving an available connection to) target PGC abstractions and for passing to the targets parameters affecting target operation. The GPs are further utilized by target PGC abstractions primarily for establishing, manipulating and recalling localized variables (i.e. relating to a currently executing PGC command set).

For example, at a time prior to initiating playback of a chapter, a source PGC abstraction stores a value in GP10 ("stream select"). That value will later indicate to a target PGC which audio, subtitle and/or angle stream is to be selected for movie playback. A further example is that, at a time prior to routing control to a target PGC abstraction, a source PGC abstraction stores a target's designation in a combination of registers GP12 ("Movie Number") and GP14 ("Chapter Number") for a movie target or GP13 ("Button Number") for a menu target. Finally, PGC abstractions preferably utilize GP15 to temporarily store values, typically for use within a current PGC operation.

In most cases, only a portion of a given register ("register bits") are utilized, while conversely, a given register may be used for multiple purposes, as seen in the utilization of GP10 in the register chart. Those skilled in the art will appreciate, given the discussion herein, that the preferred embodiment enables certain advantages. Among these are that a single register or register set can be designated in all cases for similar purposes, thereby minimizing complexities, the number of registers required and the number of commands required within a PGC without detrimentally affecting routing or parameter passing flexibility. Similarly, operations required to parse register data containing multiple data values are not needed. Other arrangements consistent with the teachings of the invention however, are likely in view of other applications facilitated by these teachings and in accordance with the scope and spirit of the invention.

While the present invention has been described herein with reference to a particular embodiment thereof, a latitude of modification, various changes and Substitutions are intended in the foregoing disclosure, and it will be appreciated that in some instances some features of the invention will be employed without a corresponding use of other features without departing from the spirit and scope of the invention as set forth.

APPENDIX A: PGC ABSTRACTION SOURCE CODE

Exemplary Included Movies/Menus

2 Movies with 3 chapters each
2 Menus with 4 Buttons each
Exemplary Included Connections

| Connections Source | | Connections Target |
|---|---|---|
| Movie 1 : Chapter 1 Remote Key | -> | Menu 1: Button 1 |
| Movie 1 : Chapter 2 Remote Key | -> | Menu 1: Button 2 |
| Movie 1 : Chapter 3 Remote Key | -> | Menu 1: Button 3 |
| Movie 1 : Chapter 3 End | -> | Menu 1: Button 1 |
| Movie 2 : Chapter 1 Remote Key | -> | Menu 2: Button 1 |
| Movie 2 : Chapter 2 Remote Key | -> | Menu 2: Button 2 |
| Movie 2 : Chapter 3 Remote Key | -> | Menu 2: Button 3 |
| Movie 2 : Chapter 3 End | -> | Menu 2: Button 1 |
| Menu 1 : Button 1 | -> | Movie 1: Chapter 1 |
| Menu 1 : Button 2 | -> | Movie 1: Chapter 2 |
| Menu 1 : Button 3 | -> | Movie 1: Chapter 3 |
| Menu 1 : Button 4 | -> | Menu 2: Button 1 |
| Menu 2 : Button 1 | -> | Movie 2: Chapter 1 |
| Menu 2 : Button 2 | -> | Movie 2: Chapter 2 |
| Menu 2 : Button 3 | -> | Movie 2: Chapter 3 |
| Menu 2 : Button 4 | -> | Menu 1: Button 1 |

-continued

APPENDIX A: PGC ABSTRACTION SOURCE CODE

PGC ABSTRACTION SOURCE CODE

1. VIDEO MANAGER ("VMGM") Program Chains ("PGCs")
First Play PGC

```
PRE_CMD#1:    MovI      GP14,   1                        // Target = Chapter 1
PRE_CMD#2:    MovI      GP12,   1                        // Target = Movie 1
PRE_CMD#3:    JumpSS            VMGM PGCI 2              // Jump To Movie Router
```
Title PGC (PGC #1)

```
PRE_CMD#1:    MovI      GP13,   1                        // Target = Button 1
PRE_CMD#2:    LinkPGCN          PGCN = 3                 // Jump to Menu 1
```
Movie Router PGC (VMGM PGC #2)

```
PRE_CMD#1:    MovI      GP15,   1                        // Setup Comparision to 1
PRE_CMD#2:    EQ        GP15,   GP12    JumpTT TTN = 1   // If Target Movie = goto Movie1
PRE_CMD#3:    MovI      GP15,   2                        // Setup Comparision to 2
PRE_CMD#4:    EQ        GP15,   GP12    JumpTT TTN = 2   // If Target Movie = 2, goto Movie 2
PRE CMD#5:    JumpSS            First Play               // Should never get here
```
Menu 1 Display PGC (VMGM PGC #3)

```
PRE_CMD#1:    Mov       GP15,   GP13                     // Put target button no. into temp storage
PRE_CMD#2:    MulI      GP15,   1024                     // Shift Button number by 10 Bits to the left
PRE CMD#3:    SetHL_BTNN        HLP = GP15               // Highlight target button in menu; display menu
```
UZ,1/18 Menu 2 Display PGC (VMGM PGC #4)
```
PRE CMD#1:    Mov       GP15,   GP13                     // Put target button no. into temp storage
PRE CMD#2:    MulI      GP15,   1024                     // Shift Button number by 10 Bits to the left
PRE CMD#3:    SetHL_BTNN        HLP = GP15               // Highlight target Button in menu; display menu
```
Menu 1 Button Router (VMGM PGC #5)

```
PRE_CMD#1:    Mov       GP15,   SP8                      // Put last highlighted button in temp storage
PRE_CMD#2:    DivI      GP15,   1024                     // Shift Button number 10 bits to the right
PRE_CMD#3:    NEI       GP15,   1 GoTo CMDNUM = 7        // If button number ≠ 1, goto CMD #7
PRE_CMD#4:    MovI      GP14,   1                        // Target = Chapter 1
PRE_CMD#5:    JumpTT            TTN = 1                  // Jump Movie 1
PRE_CMD#6:    Nop
PRE_CMD#7:    NEI       GP15,   2 GoTo CMDNUM = 11       // If button number ≠ 2, goto CMD #11
PRE_CMD#8:    MovI      GP14,   2                        // Target = Chapter 2
PRE_CMD#9:    JumpTT            TTN = 1                  // Jump Movie 1
PRE_CMD#10:   Nop
PRE_CMD#11:   NEI       GP15,   3 GoTo CMDNUM = 15       // If button number ≠ 3, goto CMD #15
PRE_CMD#12:   MovI      GP14,   3                        // Target = Chapter 3
PRE_CMD#13:  JumpTT             TTN = 1                  // Jump Movie 1
PRE_CMD#14:   Nop
PRE_CMD#15:   MovI      GP13,   1                        // Target = Button 1
PRE_CMD#16:   LinkPGCN          PGCN = 4                 // Jump Menu 2
```
Menu 1 Button Router (VMGM PGC #6)

```
PRE_CMD#1:    Mov       GP15,   SP8                      // Put last highlighted button in temp storage
PRE_CMD#2:    DivI      GP15,   1024                     // Shift Button number 10 bits to the right
PRE_CMD#3:    NEI       GP15,   1 GoTo CMDNUM = 7        // If button number ≠ 1, goto CMD #7
PRE_CMD#4:    MovI      GP14,   1                        // Target = Chapter 1
PRE_CMD#5:    JumpTT            TTN = 2                  // Jump Movie 2
PRE_CMD#6:    Nop
PRE_CMD#7:    NEI       GP15,   2 GoTo CMDNUM = 11       // If button number ≠ 2, goto CMD #11
PRE_CMD#8:    MovI      GP14,   2                        // Target = Chapter 2
PRE_CMD#9:    JumpTT            TTN = 2                  // Jump Movie 2
PRE_CMD#10:   Nop
PRE_CMD#11:   NEI       GP15,   3 GoTo CMDNUM = 15       // If button number ≠ 3, goto CMD #15
PRE_CMD#12:   MovI      GP14,   3                        // Target = Chapter 3
PRE_CMD#13:   JumpTT            TTN = 2                  // Jump Movie 2
PRE_CMD#14:   Nop
PRE_CMD#15:   MovI      GP13,   1                        // Target = Button 1
PRE_CMD#16:   LinkPGCN          PGCN = 3                 // Jump Menu 1
```
Title 1 End Router Chapter 3 (VMGM PGC #7)

```
PRE_CMD#1:    MovI      GP13,   1                        // Target = Button 1
PRE_CMD#2:    LinkPGCN          PGCN = 3                 // Jump Menu 1
```
Title 2 End Router Chapter 3 (VMGM PGC #8)

```
PRE_CMD#1:    MovI      GP13,   1                        // Target = Button 1
PRE_CMD#2:    LinkPGCN          PGCN = 4                 // Jump Menu 2
```
2. Video Title Segment #1 ("VTS-1") PGCs
Movie 1 Display PGC (VTS PGC #1)

```
PRE_CMD#1:    Mov       GP15,   GP14                     // Move Target Chapter into temp storage
PRE_CMD#2:    MovI      GP14,   0                        // Zero Target Chapter register
```

-continued

APPENDIX A: PGC ABSTRACTION SOURCE CODE

```
PRE_CMD#3:    EQI      GP15,   1     LinkPGN   PGN = 1   // If Chapter=1, Goto Program #1 (Chapter 1)
PRE_CMD#4:    EQI      GP15,   2     LinkPGN   PGN = 2   // If Chapter=2, Goto Program #2 (Chapter 2)
PRE_CMD#5:    EQI      GP15,   3     LinkPGN   PGN = 3   // If Chapter=3, Goto Program #3 (Chapter 3)
End CMD for Movie 1 Chapter 3 (VTS PGC #1)

C_CMD#1:      CallSS   VMGM_PGCN = 7, DOMAIND = 3        // Jump to VMGM PGC #7 (Title1, End-router for Chapter 3)
Chapter Router PGC (VTSM PGC #1)

PRE_CMD#1:    Mov      GP15,   SP7                       // Put last played chapter into temp storage
PRE_CMD#2:    Nop
PRE_CMD#3:    Nop
PRE_CMD#4:    Nop
PRE_CMD#5:    GEI      GP15,   2 GoTo CMDNUM = 9         // If last chapter ≧ 2, goto CMD #9
PRE_CMD#6:    MovI     GP13,   1                         // Target = Button 1
PRE_CMD#7:    JumpSS   VMGM_PGCN = 3, DOMAIND = 3        // Jump to Menu 1
PRE_CMD#8:    Nop
PRE_CMD#9:    GEI      GP15,   3 GoTo CMDNUM = 13        // If last chapter ≧ 3, goto CMD #13
PRE_CMD#10:   MovI     GP13,   2                         // Target = Button 2
PRE_CMD#11:   JumpSS   VMGM_PGCN = 3, DOMAIND = 3        // Jump to Menu 1
PRE_CMD#12:   Nop
PRE_CMD#13:   MovI     GP13,   3                         // Target = Button 3
PRE_CMD#14:   JumpSS   VMGM_PGCN = 3, DOMAIND = 3        // Jump to Menu 1
3. Video Title Segment #2 ("VTS-2") PGCS
PRE_CMD#1:    Mov      GP15,   GP14                      // Move Target Chapter into temp storage
PRE_CMD#2:    MovI     GP14,   0                         // Zero Target Chapter register
PRE_CMD#3:    EQI      GP15,   1     LinkPGN   PGN = 1   // If Chapter=1, Goto Program #1 (Chapter 1)
PRE_CMD#4:    EQI      GP15,   2     LinkPGN   PGN = 2   // If Chapter=2, Goto Program #2 (Chapter 2)
PRE_CMD#5:    EQI      GP15,   3     LinkPGN   PGN = 3   // If Chapter=3, Goto Program #3 (Chapter 3)
End CMD for Movie 2 Chapter 3 (VTS PGC #1)

C_CMD#1:      CallSS   VMGM_PGCN = 7, DOMAIND = 3        // Jump to VMGM PGC #8 (Title 2 End-router for Chapter 3)
Chapter Router PGC (VTSM PGC #1)

PRE_CMD#1:    Mov      GP15,   SP7                       // Put last played chapter into temp storage
PRE_CMD#2:    Nop
PRE_CMD#3:    Nop
PRE_CMD#4:    Nop
PRE_CMD#5:    GEI      GP15,   2 GoTo CMDNUM = 9         // If last chapter ≧ 2, goto CMD #9
PRE_CMD#6:    MovI     GP13,   1                         // Target = Button 1
PRE_CMD#7:    JumpSS   VMGM_PGCN = 4, DOMAIND = 3        // Jump to Menu 1
PRE_CMD#8:    Nop
PRE_CMD#9:    GEI      GP15,   3 GoTo CMDNUM = 13        // If last chapter ≧ 3, goto CMD #13
PRE_CMD#10:   MovI     GP13,   2                         // Target = Button 2
PRE_CMD#11:   JumpSS   VMGM_PGCN = 4, DOMAIND = 3        // Jump to Menu 2
PRE_CMD#12:   Nop
PRE_CMD#13:   MovI     GP13,   3                         // Target = Button 3
PRE_CMD#14:   JumpSS   VMGM_PGCN = 4, DOMAIND = 3        // Jump to Menu 2
```

We claim:

1. A method for compiling an authored DVD video program, the method comprising:

providing an abstraction layer between menu buttons, movie chapters and connections therebetween, and interconnected PGCs, their instructions and their allocation within a DVD video space and domain structure;

whereby an author of the DVD video program is able to author the DVD video program by referencing elements of the abstaction layer rather than by referencing the interconnected PGCs, their instructions and their allocation within the DVD video space and domain structure.

2. A system for compiling an authored multimedia presentation to form a DVD video program, the system comprising:

means for providing an abstraction layer on top of interconnected PGCs, their instructions and their allocation within a DVD video space and domain structure; and means for compiling elements of the abstraction layer to generate DVD program code and content.

3. A system for compiling an authored multimedia presentation to form a DVD video program, the system comprising:

means for authoring DVD program content; and means for interlinking content elements with one another using automatically generated dummy PGCs.

4. A method for compiling an authored multimedia presentation to form a DVD video program, the method comprising establishing an abstracted reference to program code referenced in a DVD program before an absolute reference to the program code is known.

* * * * *